(12) United States Patent
Kawamoto

(10) Patent No.: US 10,713,413 B2
(45) Date of Patent: Jul. 14, 2020

(54) IMAGE PROCESSING APPARATUS AND RECORDING MEDIUM

(71) Applicant: Konica Minolta, Inc., Chiyoda-ku, Tokyo (JP)

(72) Inventor: Masayuki Kawamoto, Amagasaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/471,613

(22) Filed: Mar. 28, 2017

(65) Prior Publication Data
US 2017/0286367 A1    Oct. 5, 2017

(30) Foreign Application Priority Data

Mar. 29, 2016  (JP) ................................ 2016-064891

(51) Int. Cl.
*G06F 40/106*   (2020.01)
*G06F 40/14*    (2020.01)
*H04N 1/00*     (2006.01)

(52) U.S. Cl.
CPC ............ *G06F 40/106* (2020.01); *G06F 40/14* (2020.01); *H04N 1/00464* (2013.01);
(Continued)

(58) Field of Classification Search
CPC .......................... G06F 17/212; G06F 17/2247
(Continued)

(56) References Cited

U.S. PATENT DOCUMENTS 5,897,644 A * 4/1999 Nielsen ................... G06F 9/451
                                                       715/210
6,185,589 B1 * 2/2001 Votipka ................ G06F 40/177
                                                       715/206
(Continued)

FOREIGN PATENT DOCUMENTS

JP    H07262222 A    10/1995
JP    2000222330 A    8/2000
(Continued)

OTHER PUBLICATIONS

M. Sonoda et al., "The Knowledge of Javascript", Shuwa System, Jan. 1, 2015, First Edition. (7 pages), cited in English translation of JP Office Action.
(Continued)

*Primary Examiner* — Stephen S Hong
*Assistant Examiner* — Broderick C Anderson
(74) *Attorney, Agent, or Firm* — Buchanan Ingersoll & Rooney PC

(57) ABSTRACT

An image processing apparatus determines a type of a display target content of a browser and acquires information on a size of a display part of the image processing apparatus. Further, the image processing apparatus displays the display target content on the display part by using the browser, on the basis of a determination result on the type of the display target content. When the display target content is determined to be a specific type of content, the apparatus enlarges the display target content in conformity with the size of the display part and displays the display target content, regardless of whether or not there is a size specification in the display target content, and when the display target content is determined not to be the specific type of content, the apparatus displays the display target content in accordance
(Continued)

with a specification content included in the display target content.

23 Claims, 21 Drawing Sheets

(52) U.S. Cl.
CPC ..... *H04N 1/00469* (2013.01); *H04N 1/00482* (2013.01); *H04N 2201/0094* (2013.01)

(58) Field of Classification Search
USPC .......................................................... 715/238
See application file for complete search history.

(56) References Cited

U.S. PATENT DOCUMENTS

| | | | | |
|---|---|---|---|---|
| 2004/0107403 A1* | 6/2004 | Tetzchner | ......... | G06F 17/30905 715/227 |
| 2005/0131887 A1* | 6/2005 | Rohrabaugh | ..... | G06F 17/30905 |
| 2010/0029340 A1* | 2/2010 | Klassen | ............ | G06F 17/30905 455/566 |
| 2010/0218089 A1* | 8/2010 | Chao | ........................ | G09G 5/14 715/246 |
| 2012/0001914 A1* | 1/2012 | Pan | ........................ | G09G 5/391 345/428 |
| 2012/0033258 A1 | 2/2012 | Fukasawa et al. | | |
| 2013/0007603 A1* | 1/2013 | Dougherty | .............. | G06T 11/60 715/251 |
| 2015/0103092 A1* | 4/2015 | Khambanonda | .......... | G06T 3/40 345/593 |
| 2015/0278165 A1* | 10/2015 | Kim | ...................... | G06F 40/106 715/252 |

FOREIGN PATENT DOCUMENTS

| | | | |
|---|---|---|---|
| JP | 2009-015753 A | | 1/2009 |
| JP | 2009015753 A | * | 1/2009 |
| JP | 2010109613 A | | 5/2010 |
| JP | 2012-039356 A | | 2/2012 |

OTHER PUBLICATIONS

Office Action (Notice of Reasons for Refusal) dated Oct. 1, 2019, by the Japanese Patent Office in corresponding Japanese Patent Application No. 2016-064891, and an English Translation of the Office Action (6 pages).

* cited by examiner

APPLICATION MARKET

| APPLICATION AP1 | APPLICATION AP2 |
| --- | --- |
| * * * * * * * * * * * * * * * * | * * * * * * * * * * * * * * |
| APPLICATION AP3 | APPLICATION AP4 |
| * * * * * * * * * * * * * * * * | * * * * * * * * * * * * * * |

Fig.15
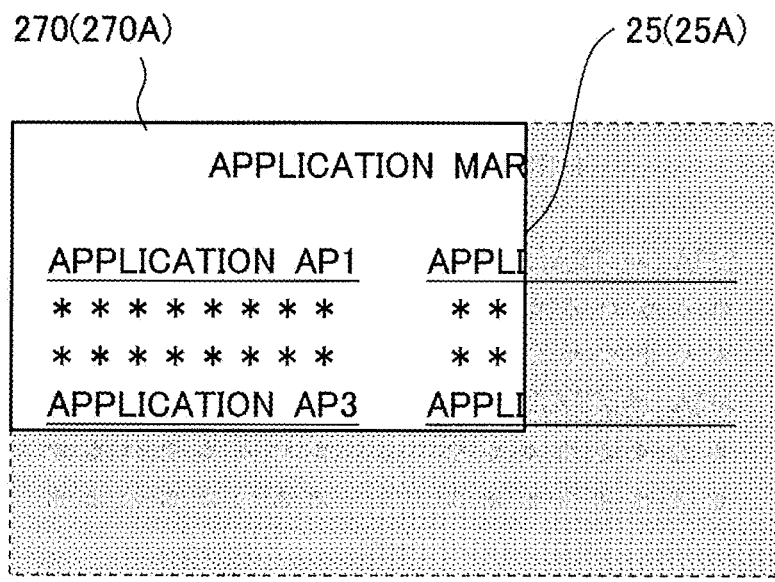
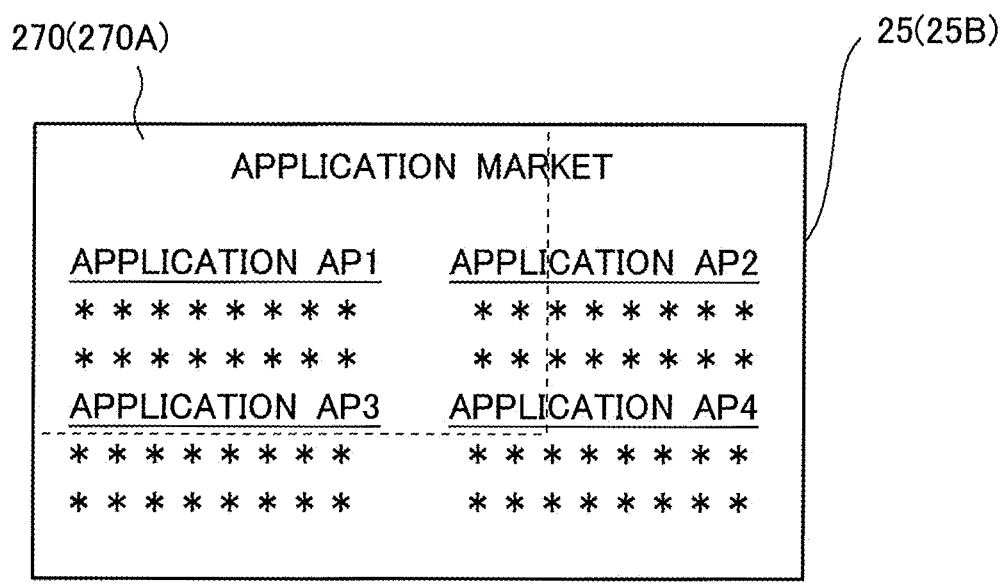

Fig.17

<html km_size = "width=800, heitght=600, ··· " ··· >

Fig.18

<html km_type = "panel" ··· >

Fig.19

FILE NAME: abcresize.html

Fig.21
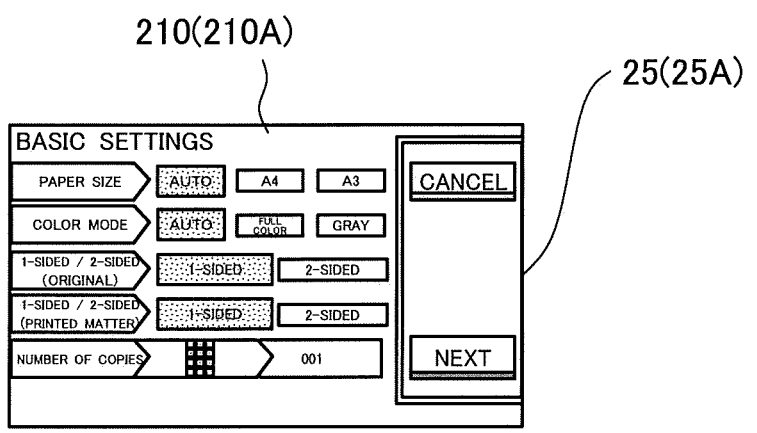
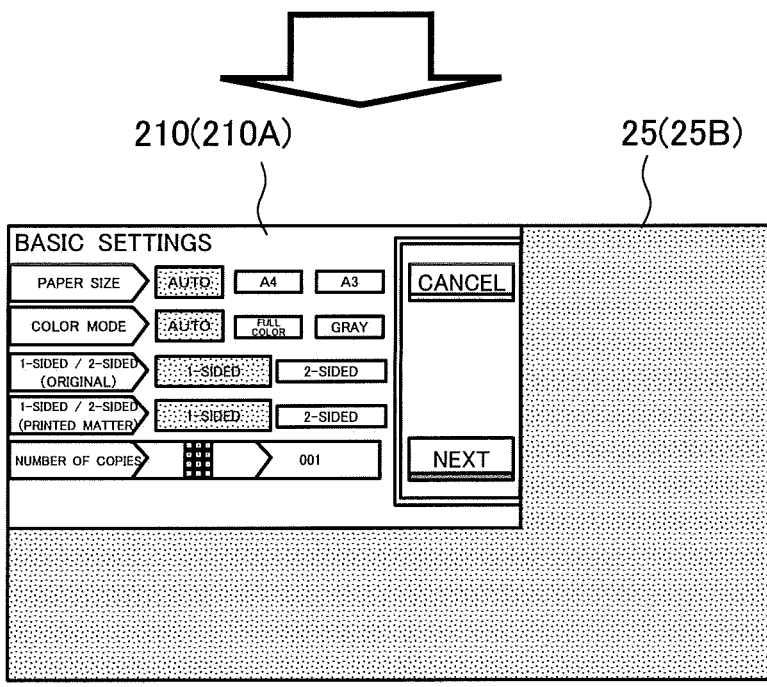

Fig.23
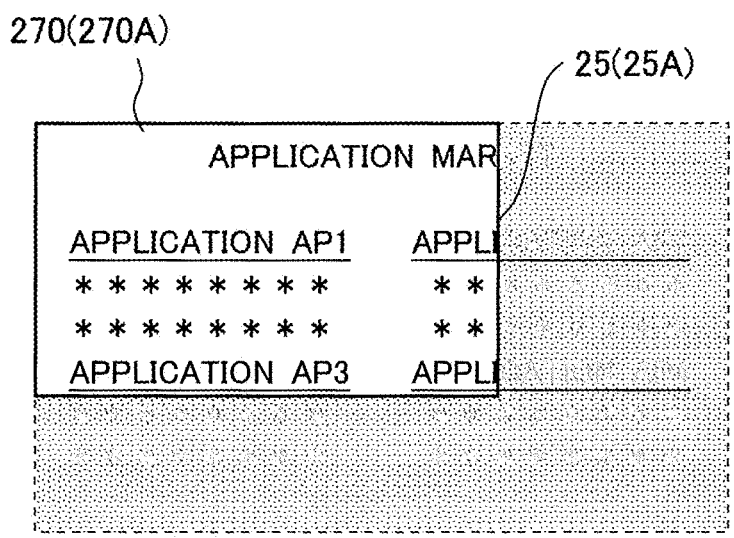
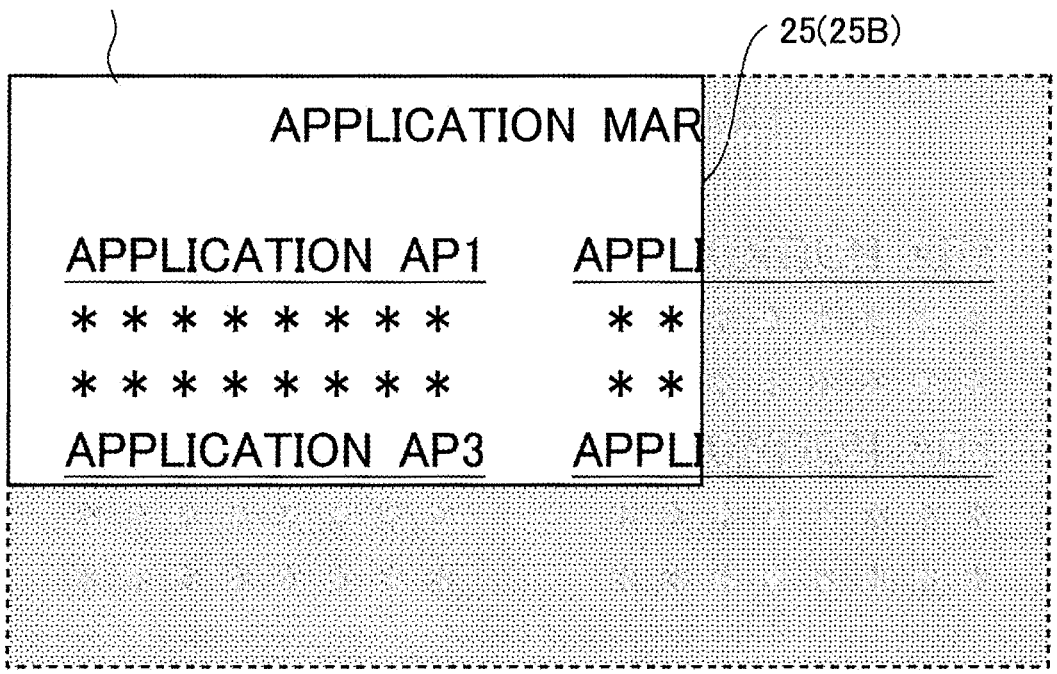

IMAGE PROCESSING APPARATUS AND RECORDING MEDIUM

The present U.S. patent application claims a priority under the Paris Convention of Japanese patent application No. 2016-064891 filed on Mar. 29, 2016, the entirety of which is incorporated herein by references.

BACKGROUND OF THE INVENTION

Field of the Invention

The present invention relates to an image processing apparatus such as an MFP (Multi-Functional Peripheral) and its relevant technique.

Description of the Background Art

In recent years, an image processing apparatus such as an MFP is provided with a web browser (hereinafter, also referred to simply as a "browser") and capable of performing communication with various web servers (hereinafter, also referred to simply as "servers") (see Japanese Patent Application Laid Open Gazette No. 2012-039356).

Further, the browser of the MFP is capable of performing communication with a server (external server) provided outside the MFP, and also capable of performing communication with a server (internal server) provided inside the MFP.

As to the communication between the browser of the MFP and the internal server of the MFP, for example, the browser can acquire information of the MFP through the internal server and display the received information in a window screen thereof. In more detail, the browser of the MFP can acquire information on various setting items and the like in the MFP through the internal server of the MFP from the MFP (in detail, a memory part inside the MFP) and display therein a menu screen (operation screen) regarding the setting items of the MFP. In other words, by using the browser, an operation screen of the MFP can be constructed. In such a technique for displaying the operation screen, display data described in a web-based format is interpreted by the browser and visualized as a display screen (image).

Further, the browser of the MFP is capable of performing communication also with the external server and displaying general web pages and the like. Furthermore, the browser of the MFP is also capable of performing communication with the internal server and displaying pages other than the operation screen.

Thus, in the MFP, various screens including not only the operation screen but also other types of screens can be displayed by using the browser.

Incidentally, operation panels (display parts) of the MFPs have been gradually upsized, and the number of pixels in an operation panel has increased.

When a conventional operation screen (in more detail, an operation screen described as a web page content) is displayed on such an operation panel, if the conventional operation screen is displayed at unchanged number of pixels, a blank area occurs, for example, at the right end and the lower end of the operation panel (see a lower stage of FIG. 21 (described later)). In this case, since the size of the operation screen itself is not also changed, full advantage of the increase in the number of pixels of the panel is not taken. Further, it looks bad.

In order to solve this problem, it can be proposed to enlarge the web page content to be displayed in consideration of the new panel size and display the enlarged web page content.

The web contents to be displayed, however, also include a content other than the operation screen. In displaying such contents, if the contents are uniformly enlarged, some trouble may occur.

Specifically, when the content is enlarged and displayed, characters are upsized but the amount of information (the number of characters or the like) to be displayed in a display target area does not increase (see FIG. 23 (described later)). Depending on the content, though it is better to increase the amount of information to be displayed in the display target area, the benefit of the upsizing of the panel is not sufficiently enjoyed in some cases. Even though the panel size is increased, there is a case, for example, where a scroll operation is still required in order to acquire information written in a neighboring portion (right-side portion, lower-side portion, and the like) adjacent to the current display target portion in a display target content, or the like case. For such a content, it is rather preferable not to perform an enlarged display.

SUMMARY OF THE INVENTION

It is an object of the present invention to provide a technique for performing an appropriate display in a browser in accordance with the type of a content.

The present invention is intended for an image processing apparatus. According to a first aspect of the present invention, the image processing apparatus includes a determination part for determining a type of a display target content of a browser, an acquisition part for acquiring information on a size of a display part of the image processing apparatus, and a display control part for displaying the display target content on the display part by using the browser, on the basis of a determination result on the type of the display target content, and in the image processing apparatus of the present invention, the display control part enlarges the display target content in conformity with the size of the display part and displays the display target content, regardless of whether or not there is a size specification in the display target content, when the display target content is determined to be a specific type of content, and the display control part displays the display target content in accordance with a specification content included in the display target content when the display target content is determined not to be the specific type of content.

The present invention is also intended for a non-transitory computer-readable recording medium. According to a second aspect of the present invention, the non-transitory computer-readable recording medium records therein a computer program to be executed by a computer, to cause the computer to perform the steps of a) determining a type of a display target content of a browser, b) acquiring information on a size of a display part for displaying thereon a display screen of the browser, and c) displaying the display target content on the display part by using the browser, on the basis of a determination result on the type of the display target content, and in the computer program of the present invention, the step c) has the steps of c-1) enlarging the display target content in conformity with the size of the display screen of the browser and displaying the display target content, regardless of whether or not there is an enlargement specification in the display target content, when the display target content is determined to be a specific type of content, and c-2) displaying the display target content in accordance with a specification content included in the display target content when the display target content is determined not to be the specific type of content.

These and other objects, features, aspects and advantages of the present invention will become more apparent from the following detailed description of the present invention when taken in conjunction with the accompanying drawings.

BRIEF DESCRIPTION OF THE DRAWINGS

FIG. 14 is a view showing an exemplary content other than the "size-fixed content";

FIG. 15 is a view showing a manner of displaying the content of FIG. 14;

FIG. 17 is a view showing a specification using a specific customization attribute (size);

FIG. 18 is a view showing a specification using a specific customization attribute (type);

FIG. 19 is a view showing a file name of a display target content;

FIGS. 21 to 23 are views each showing an exemplary display in accordance with a comparative example.

DESCRIPTION OF THE PREFERRED EMBODIMENTS

Hereinafter, an embodiment of the present invention will be described with reference to the drawings. However, the scope of the invention is not limited to the illustrated examples.

1. The First Preferred Embodiment

<1-1. Overall Constitution of System>

Figure 1:
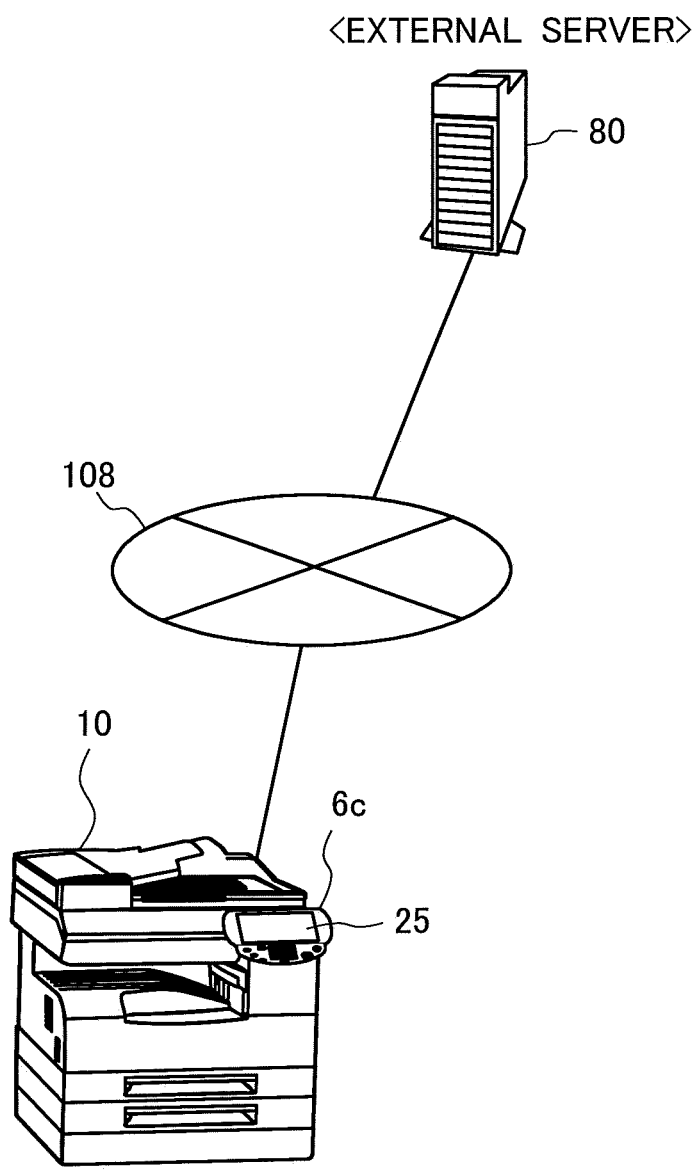
FIG. 1 is a view showing an image processing system in accordance with a first preferred embodiment.

FIG. 1 is a view showing an image processing system 1 (also referred to as 1A) in accordance with the first preferred embodiment. As shown in FIG. 1, this image processing system 1 comprises an image processing apparatus 10 and an external server 80.

The constituent elements 10 and 80 in the present system 1 are communicably connected to each other via a network 108. The network 108 includes a LAN (Local Area Network), the internet, and the like. The connection to the network 108 may be wired or wireless.

<1-2. Constitution of Image Processing Apparatus>

In the present preferred embodiment, as the image processing apparatus 10, exemplarily shown is an MFP (Multi-Functional Peripheral). The MFP 10 is also referred to as an image forming apparatus. Further, since the MFP 10 is an apparatus capable of displaying various information, the MFP 10 is also referred to as an information display apparatus or the like. Similarly, the image processing system 1 is also referred to as an information display system or the like.

Figure 2:
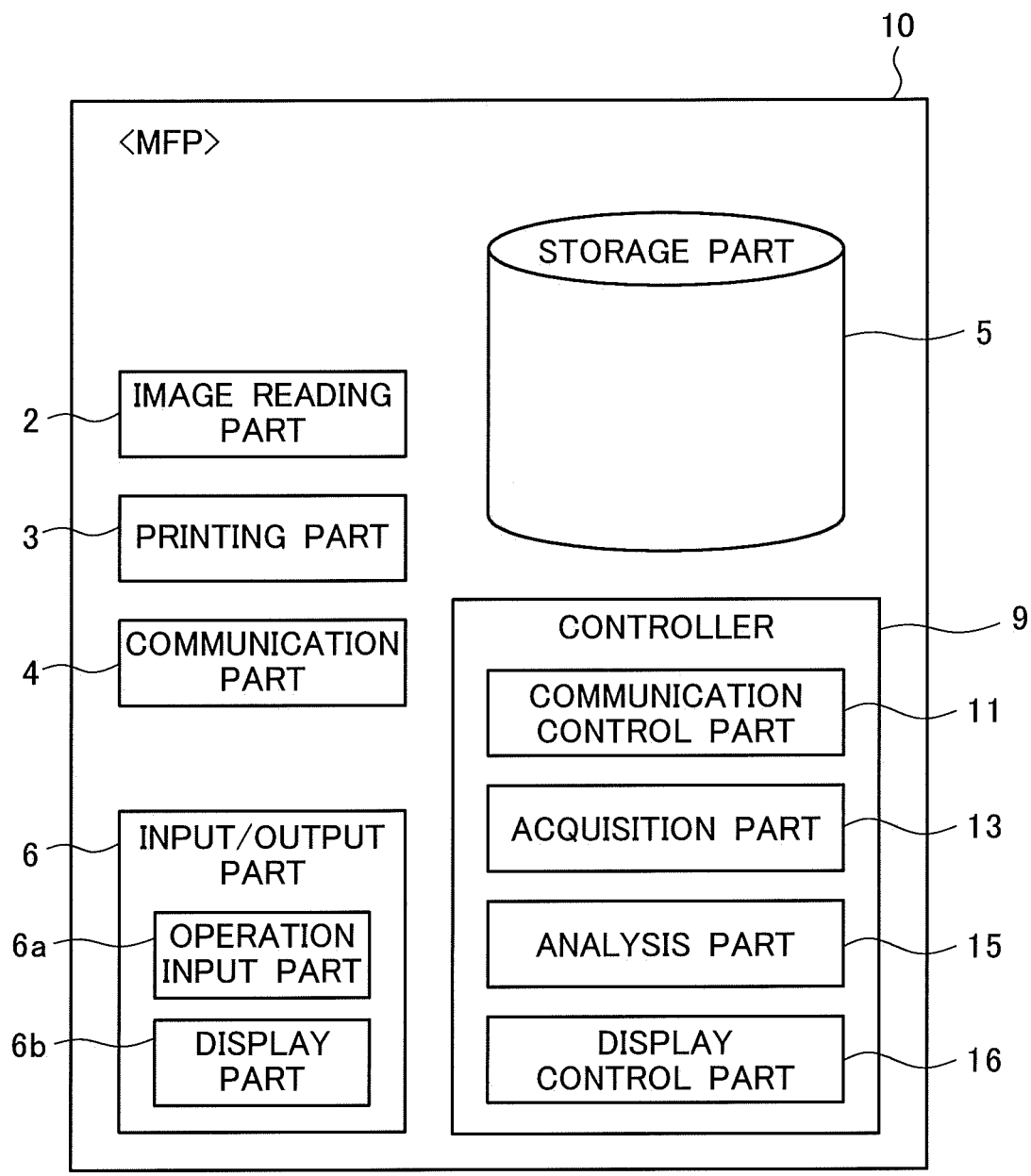
FIG. 2 is a functional block diagram showing a schematic constitution of an MFP.

FIG. 2 is a functional block diagram showing a schematic constitution of the MFP 10.

The MFP 10 is an apparatus (also referred to as a multifunction machine) having a scanner function, a copy function, a facsimile function, a box storage function, and the like. Specifically, as shown in the functional block diagram of FIG. 2, the MFP 10 comprises an image reading part 2, a printing part 3, a communication part 4, a storage part 5, an input/output part 6, a controller 9, and the like, and multiply uses these constituent parts to implement various functions.

The image reading part 2 is a processing part which optically reads (in other words, scans) an original manuscript placed on a predetermined position of the MFP 10 and generates image data of the original manuscript (also referred to as an "original manuscript image" or a "scan image"). The image reading part 2 is also referred to as a scanning part.

The printing part 3 is an output part which prints out an image to various media such as paper on the basis of the data on an object to be printed.

The communication part 4 is a processing part capable of performing facsimile communication via public networks or the like. Further, the communication part 4 is capable of performing network communication via the network 108. The network communication uses various protocols such as TCP/IP (Transmission Control Protocol/Internet Protocol) and the like. By using the network communication, the MFP 10 can transmit and receive various data to/from desired partners.

The storage part 5 is a storage unit such as a hard disk drive (HDD) or/and the like.

The input/output part 6 comprises an operation input part 6a for receiving an input which is given to the MFP 10 and a display part 6b for displaying various information thereon. This MFP 10 is provided with a substantially plate-like operation panel part 6c (see FIG. 1), and the operation panel part 6c has a touch panel (also referred to as an operation panel or a display panel) 25 (see FIG. 1) on a front surface side thereof. The touch panel 25 is a liquid crystal display panel in which a piezoelectric sensor or the like is embedded, and is capable of displaying various information and receiving an operation input from an operator. On the touch panel 25, for example, displayed are various screens (including button images and the like) such as a menu screen and the like, or the like. By pressing buttons (represented by the button images) which are virtually arranged in the touch panel 25, the operator can set various operations of the MFP 10, or the like. The touch panel 25 serves as part of the operation input part 6a and also serves as part of the display part 6b.

The controller 9 is a control unit for generally controlling the MFP 10. The controller 9 is a computer system which is embedded in the MFP 10 and comprises a CPU, various semiconductor memories (RAM and ROM), and the like. The controller 9 causes the CPU to execute a predetermined software program (in more detail, a group of program modules) stored in the ROM (e.g., EEPROM (registered trademark)), to thereby implement various processing parts. Further, the software program (hereinafter, also referred to simply as a program) may be recorded in one of various portable recording media (in other words, various non-transitory computer-readable recording media), such as a USB memory or the like, and read out from the recording medium to be installed in the MFP 10. Alternatively, the program may be downloaded via the network 108 or the like to be installed in the MFP 10.

Figure 3:
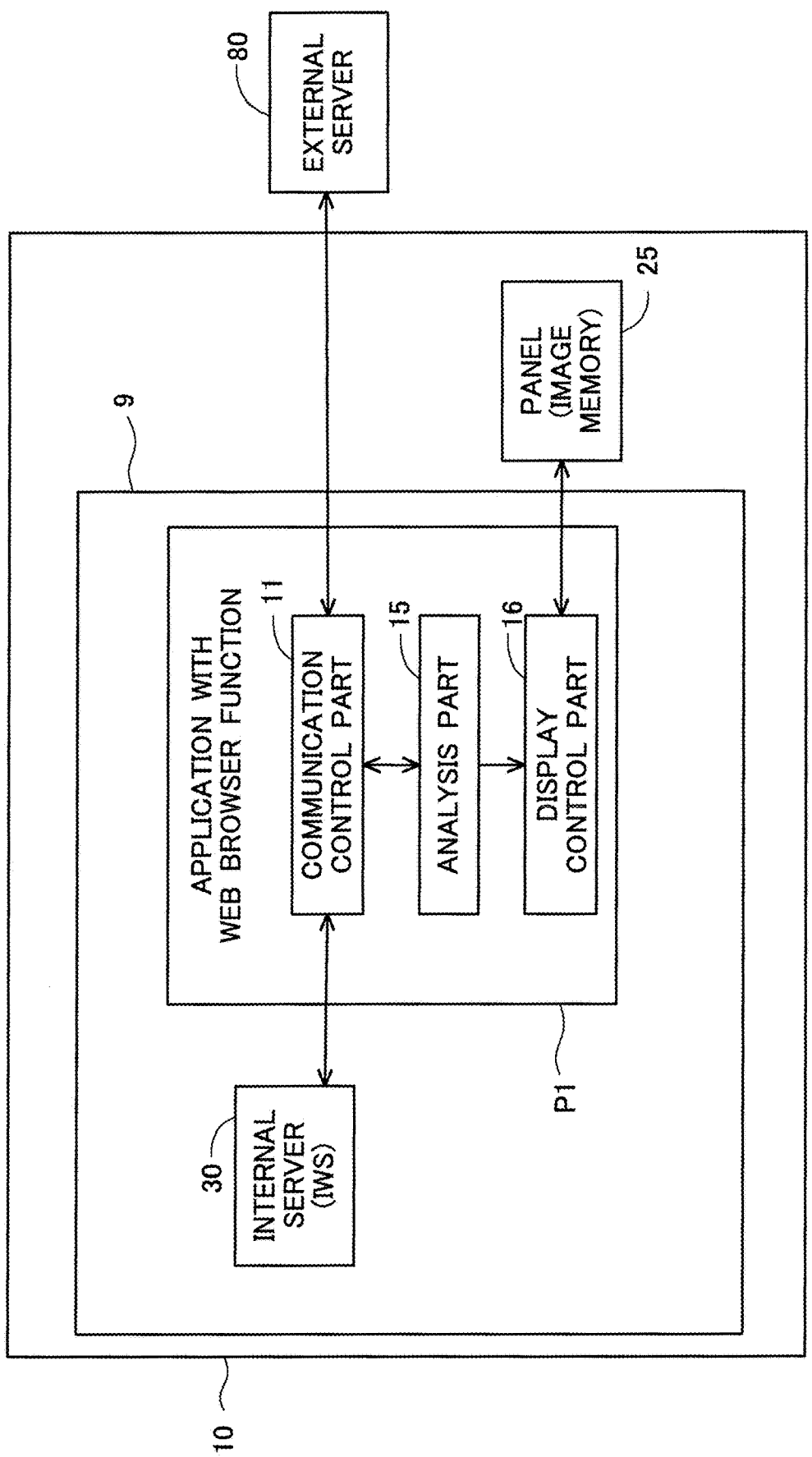
FIG. 3 is a view showing a program structure and the like in the MFP.

FIG. 3 is a view showing a program structure and the like in the MFP 10. As shown in FIG. 3, as the application software programs (hereinafter, also referred to simply as "applications") operating in the MFP 10, used are an internal server 30 (in detail, a group of program modules implementing a function as a web server, and the like), a program P1 (an application having a web browser function), and the like.

The web browser of the program P1 can access the external server 80 and also can access the internal server 30.

The program P1 performs communication with the internal web server (hereinafter, also referred to simply as the internal server) 30 by using the web browser (hereinafter, also referred to simply as the browser) function. The program P1 uses HTTP (HyperText Transfer Protocol), a script (described in a script language such as PYTHON or the like) and the like to perform various processings in cooperation with the internal server 30. The internal server 30 is also referred to as an IWS (Internet Web Server or Internal Web Server) or the like.

In cooperation with the internal server 30, the program P1 displays a display screen (an operation screen of the MFP 10, or the like) by using the browser function, and receives various operation inputs through the operation screen or the like.

In more detail, a specific address in the internal server 30 has been registered as a first access destination (D1) in the program P1, and the program P1 first accesses the specific address (e.g., mfp://iwsapp.html) by using the web browser function. Then, the program P1 displays a first operation screen by using the web browser function in the MFP 10 on the basis of display data (described in a page description language such as HTML (HyperText Markup Language) or the like) stored at the specific address. After that, in accordance with an operation of a user, the program P1 displays a next operation screen on the basis of information on an access destination (in more detail, URL (Uniform Resource Locator) of the access destination) (different from the first access destination D1) stored in the program P1. By repeating such an operation, various operation inputs are given to the MFP 10 by using the operation screens.

Further, in cooperation with the external server 80, the program P1 can also display display screens regarding various web contents on the touch panel 25, to thereby receive various operation inputs through the display screens.

Thus, the program P1 uses the browser to display various screens (display screens of the browser) on the touch panel 25 and also receive various operation inputs.

Further, as shown in FIG. 2, the controller 9 executes the program P1, to thereby implement various processing parts including a communication control part 11, an acquisition part 13, an analysis part 15, and a display control part 16.

The communication control part 11 is a processing part for controlling a communication operation with other apparatus(es) (the external server 80 and the like), or the like. The communication control part 11 also controls a communication operation with the internal server 30.

The acquisition part 13 is a processing part for acquiring information (pixel size information) on the size of the touch panel 25 (display part) of the MFP 10 (from the storage part 5 of the self-apparatus).

The analysis part 15 is a processing part for analyzing a display target content (content to be displayed) of the browser (the program P1). For example, the analysis part 15 performs a determination process and the like of determining the type of the display target content. In more detail, it is determined whether or not the display target content is a specific type of content ("size-fixed content"). Further, since the analysis part 15 is a processing part for performing the determination process, the analysis part 15 is also referred to as a determination part.

The display control part 16 is a processing part for controlling a display operation on the display part 6b (the touch panel 25 or the like). The display control part 16 controls an operation of displaying the display target content on the touch panel 25 (the display part) on the basis of a determination result on the type of the display target content of the browser.

<1-3. Operation>
<Overall Operation>

In the present preferred embodiment, when various contents (display target contents) are displayed on a touch panel 25B or the like of a new-type MFP 10, a display operation is controlled in accordance with the type of the display target content.

Specifically, first, it is determined whether or not the display target content is a specific type of content (in more detail, a content whose size is specified with a fixed value (which is also referred to as a "size-fixed content")), and the display target content is categorized into one of two groups in accordance with a determination result. In other words, the display target content is categorized into either one of a first type of content which is a specific type of content and a second type of content which is a content of any other type.

Then, when it is determined that the display target content is the first type of content ("size-fixed content"), the display target content is enlarged in conformity with the size of a display screen of a browser (herein, the size of the touch panel 25 (25B)) and displayed, regardless of whether or not there is a size specification (enlargement specification or the like) in the display target content (see FIG. 7 and the like (described later)). In short, as to the "size-fixed content", an automatic enlargement process (described later) is performed. Further, among the first type of contents, there are not only contents to be displayed by accessing the internal server 30 but also contents to be displayed by accessing the external server 80.

On the other hand, when it is determined that the display target content is not the first type of content ("size-fixed content"), the display target content is displayed in accordance with a specification content included in the display target content (see FIG. 15 (described later)). In short, as to the second type of content (content other than the "size-fixed content"), the automatic enlargement process is not performed, and the content is displayed in accordance with the specification content (enlargement ratio or the like) in the content. Further, as the second type of content, there are both contents to be displayed by accessing the internal server 30 and contents to be displayed by accessing the external server 80.

<Determination of Content Type on the Basis of Attribute Information>

In the present preferred embodiment, it is determined whether or not the display target content is the first type of content ("size-fixed content"), on the basis of attribute information or the like included in the display target content.

Specifically, when the size of a background image in the display target content is specified with a fixed value (specific value) by using a "background attribute", it is determined that the width or the height of the content is specified, and it is determined that the display target content is the "size-fixed content".

Figure 5:
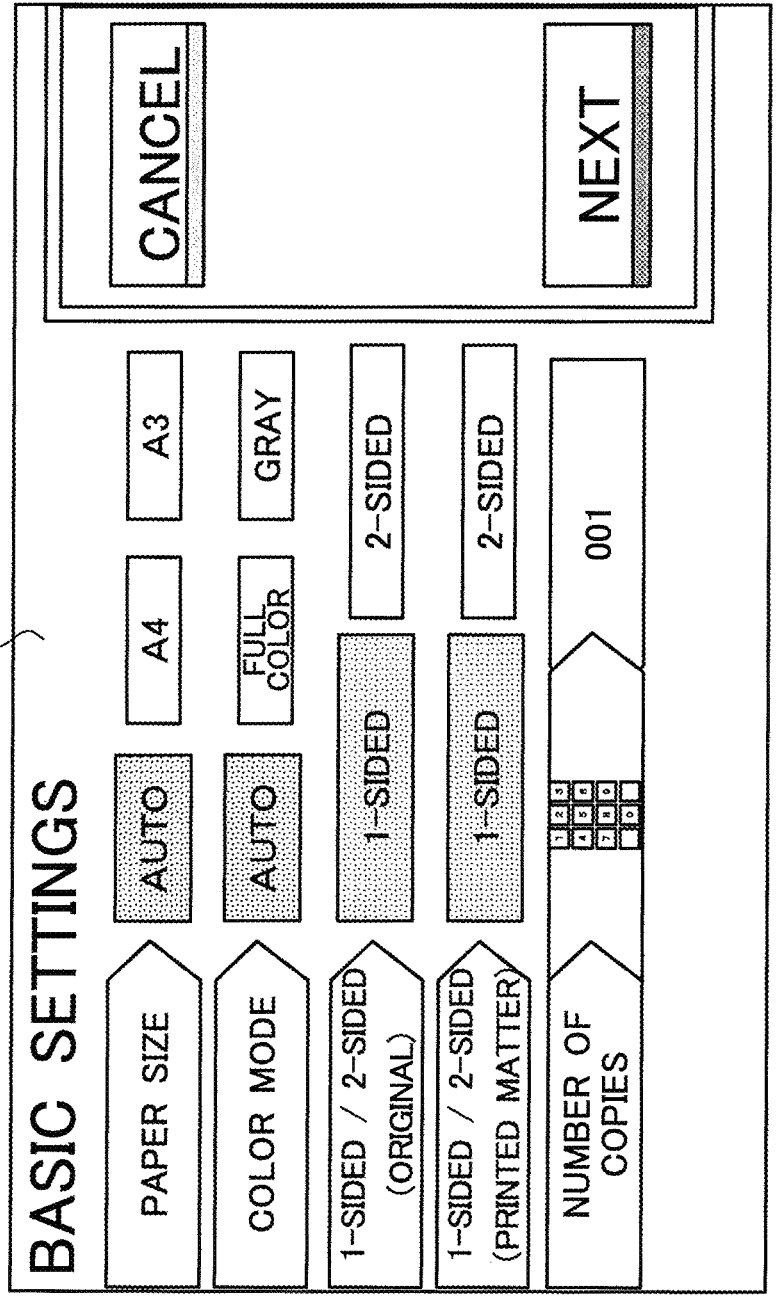
FIG. 5 is a view showing an exemplary "size-fixed content"

An operation screen 210 (an operation screen to be displayed on the touch panel 25 of the MFP 10 or the like) shown in FIG. 5, for example, is the "size-fixed content" (content whose display size is specified with a fixed value). The operation screen 210 is generated in conformity with the size of the touch panel 25 (a touch panel 25A of an old-type MFP, or the like). More specifically, the operation screen 210 (content) is generated by specifying the entire size of a display area with a fixed value and specifying the size and the arrangement position of each operation member in the display area with fixed values. Still more specifically, such a specification content is generated as data file described in a page description language (HTML or the like). Herein, it is assumed that the operation screen 210 ("size-fixed content") has been already so generated as to be suitable for the touch panel 25A of the old-type MFP.

As to the "size-fixed content", in most cases, the size of the background image in the display target content is specified with a specific value (fixed value) by using the background attribute, so as to conform the size of the entire content to the size (e.g., 640×400 pixels) of the touch panel 25 (e.g., the touch panel 25A of the old-type MFP, or the like). In more detail, by the description of <background-size: 640 px 400 px>, the size of the entire content is specified to be 640×400 pixels. In other words, the size of the background image is generally equal to the size of the content. Then, it is determined that the content having the description of size specification using the background attribute (in detail, background-size attribute) is a content whose display size is specified, and that the content is the "size-fixed content". Further, it is determined that the size of the background image is the size of the content.

When such a "size-fixed content" (content suitable for the touch panel 25A of the old-type MFP) is displayed on the touch panel 25B of the new-type MFP 10, the content is enlarged in conformity with the size of the display screen of the browser (the size of the touch panel 25B) and displayed (see FIG. 7 and the like (described later)).

Since the operation screen 210 is enlarged and displayed on the new touch panel 25B through the above operation, it is possible to efficiently use the display area of the relatively large touch panel 25B.

On the other hand, in any other case (i.e., when the size of the background image in the display target content is not specified by using the background attribute), basically, it is determined that the display target content is not the "size-fixed content". Then, the display target content is displayed on the touch panel 25B in accordance with the specification content thereof.

Since the display target content is displayed on the new touch panel 25B in accordance with the specification content thereof through the above operation, it is possible to avoid any adverse effect of an unnecessary automatic enlargement process.

<Preferential Exclusion Process>

Further, regardless of whether or not the size of the background image in the display target content is specified by using the background attribute, when either one of the following two conditions C1 and C2 is satisfied, it is always determined that the display target content is not the "size-fixed content".

The first condition C1 is that it is determined that the display target content includes a description (viewport attribute or the like) specifying in advance that a pixel number size of the display target content should be conformed to that of the display part. When the condition C1 is satisfied, it is determined that the display target content is not the specific type (first type) of content.

When it is determined that the display target content includes a description (described in a page description language) specifying that a lateral width of the content should be conformed to that of the panel, for example, it is determined that the display target content is the second type of content. In more detail, the description of <meta name="viewport" content="width=device-width"> specifies that the lateral width of the content should be conformed to that of the panel.

Further, also when it is determined that the display target content includes a description (described in a page description language) specifying that a longitudinal width (height) of the content should be conformed to that of the panel, it is determined that the display target content is not the specific type (first type) of content.

Thus, the content satisfying the condition C1 (i.e., the content on which it is specified, by using the viewport attribute, to conform the lateral width of the content to that of the panel, or the like) is determined not to be the specific type (first type) of content. In other words, the content satisfying the condition C1 is determined to be the second type of content.

Then, as to the second type of content, the automatic enlarged display for the "size-fixed content" is not applied to the content, and the content is displayed in accordance with the specification content included in the content.

When it is specified, in a web page by a description using the viewport attribute, to conform the lateral width of the content to that of the panel, for example, as described above, it is considered important that an author of the content intends to display the content with the specified display size, and any original automatic enlargement process is not performed on the browser side. It is thereby possible to prevent occurrence of any abnormal display due to the display process contrary to the intention of the author of the content, as described later. In other words, it is possible to perform a more appropriate display.

Thus, as to the content having a description (viewport attribute or the like) specifying in advance that the pixel number size of the display target content should be conformed to that of the display part, since it is preferential to display the content on the basis of the description, it is possible to perform a more appropriate display.

The second condition C2 is that it is determined that the display target content includes a description (media attribute) defining a display style in accordance with a display target medium (medium). When the condition C2 is satisfied, it is determined that the display target content is not the specific type (first type) of content. Then, as to the second type of content, the automatic enlarged display for the "size-fixed content" is not applied to the content, and the content is displayed in accordance with the specification content included in the content.

In a web page, for example, a display style can be defined for each display target medium by a description using the media attribute. In detail, in the description of the media attribute, an individual display style (style sheet or the like) can be specified for each medium such as a "screen" (screen of a personal computer), a "handheld" (portable device), or the like. Thus, as to the content whose display style is specified in advance for each medium, it is considered important that the author of the content intends to display the content in the specified display style, and any original automatic enlargement process is not performed on the browser side. It is thereby possible to prevent occurrence of any abnormal display due to the display process contrary to the intention of the author of the content. In other words, it is possible to perform a more appropriate display.

Thus, as to the content satisfying the condition C1 and/or the condition C2, the intent of the specification by the author of the content is considered important, and it is preferential to display the content on the basis of the description (specification content) in the content. It is thereby possible to perform a more appropriate display.

<1-4. Detailed Operation>
<Step S11 and the Following Steps>

Figure 4:
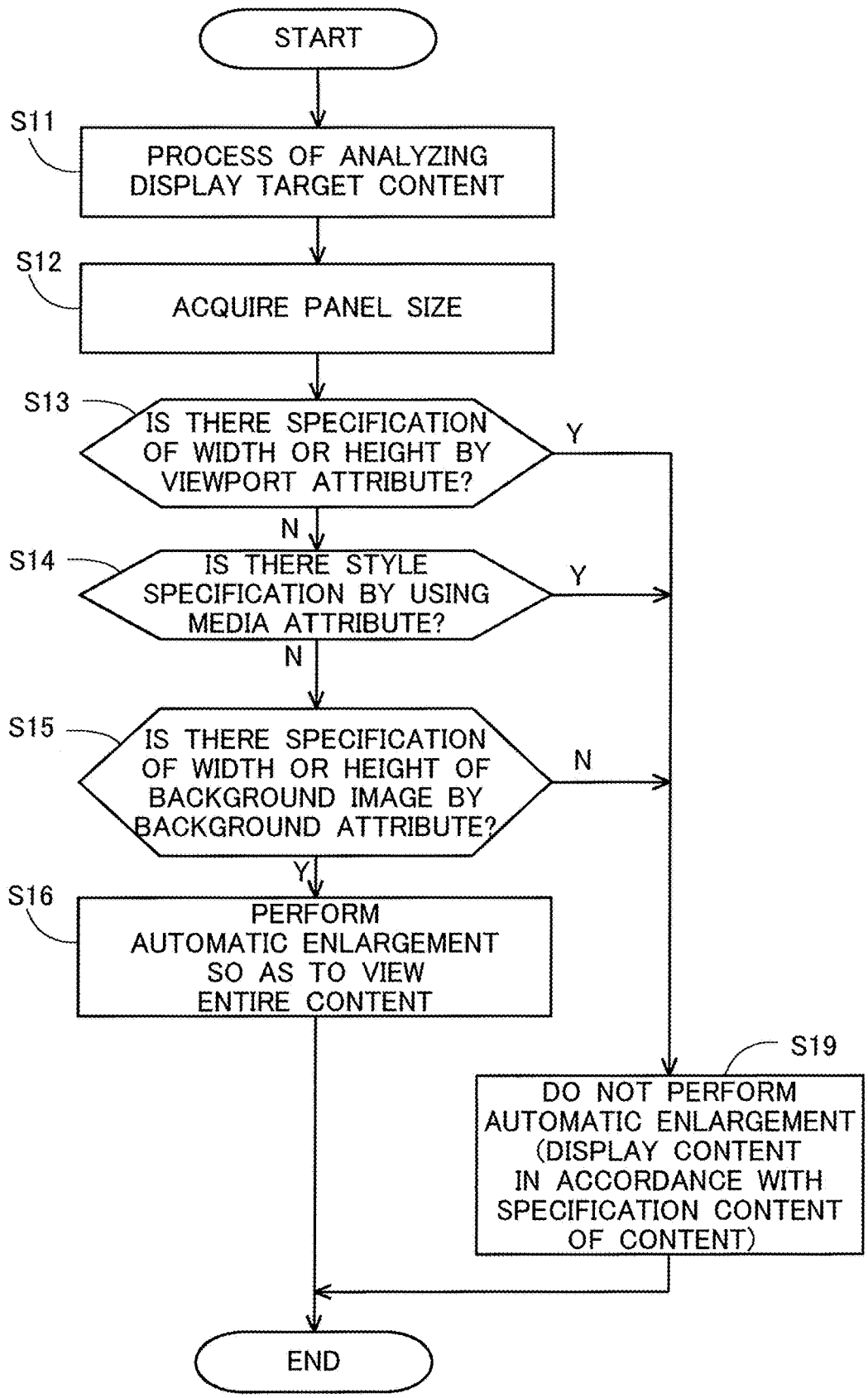
FIG. 4 is a flowchart showing an operation of the MFP.

Next, an operation of the MFP 10 will be described, with reference to FIG. 4 and the like. FIG. 4 is a flowchart showing the operation of the MFP 10. The operation is implemented by the application P1 with the browser function, or the like.

First, when the MFP 10 receives the display target content (web page content described in a page description language or the like) from the server (30 or 80), the MFP 10 analyzes the display target content (Step S11). Further, the MFP 10 acquires a panel size of the touch panel 25 (25B) of the MFP 10 in Step S12.

Then, in Steps S13 and S14, it is determined whether the conditions C1 and C2 are satisfied or not, respectively.

Specifically, in Step S13, it is determined whether or not the display target content satisfies the condition C1. When it is determined that the condition C1 is satisfied, the process goes to Step S19 (described later). On the other hand, when it is determined that the condition C1 is not satisfied, the process goes to Step S14.

In Step S14, it is determined whether or not the display target content satisfies the condition C2. When it is determined that the condition C2 is satisfied, the process goes to Step S19 (described later). On the other hand, when it is determined that the condition C2 is not satisfied, the process goes to Step S15.

In Step S15, it is determined, on the basis of the attribute information (background attribute) of the display target content, whether or not the size of the background image is specified with a fixed value. In more detail, it is determined whether or not the width or the height of the background image is specified with a fixed value by using the background attribute.

When neither the width nor the height of the background image is specified with any fixed value by using the background attribute, it is determined that the display target content is not the "size-fixed content", and the process goes to Step S19 (described later).

On the other hand, when the width or the height of the background image is specified with a fixed value by using the background attribute, it is determined that the display target content is the "size-fixed content", and the process goes to Step S16.

<Step S16>

In Step S16, a process (also referred to as an "automatic enlargement process") of automatically enlarging the display target content in conformity with the size of the display screen of the browser (herein, the size is equal to the panel size of the touch panel 25) and displaying the enlarged content. This automatic enlargement process is performed in a sort of forceful manner, regardless of whether or not there is a size specification (enlargement specification) in the display target content. Further, in the present preferred embodiment, as described later, an enlargement ratio used in the automatic enlargement process is determined to be a relatively smaller one of a value R1 and a value R2.

Figure 6:
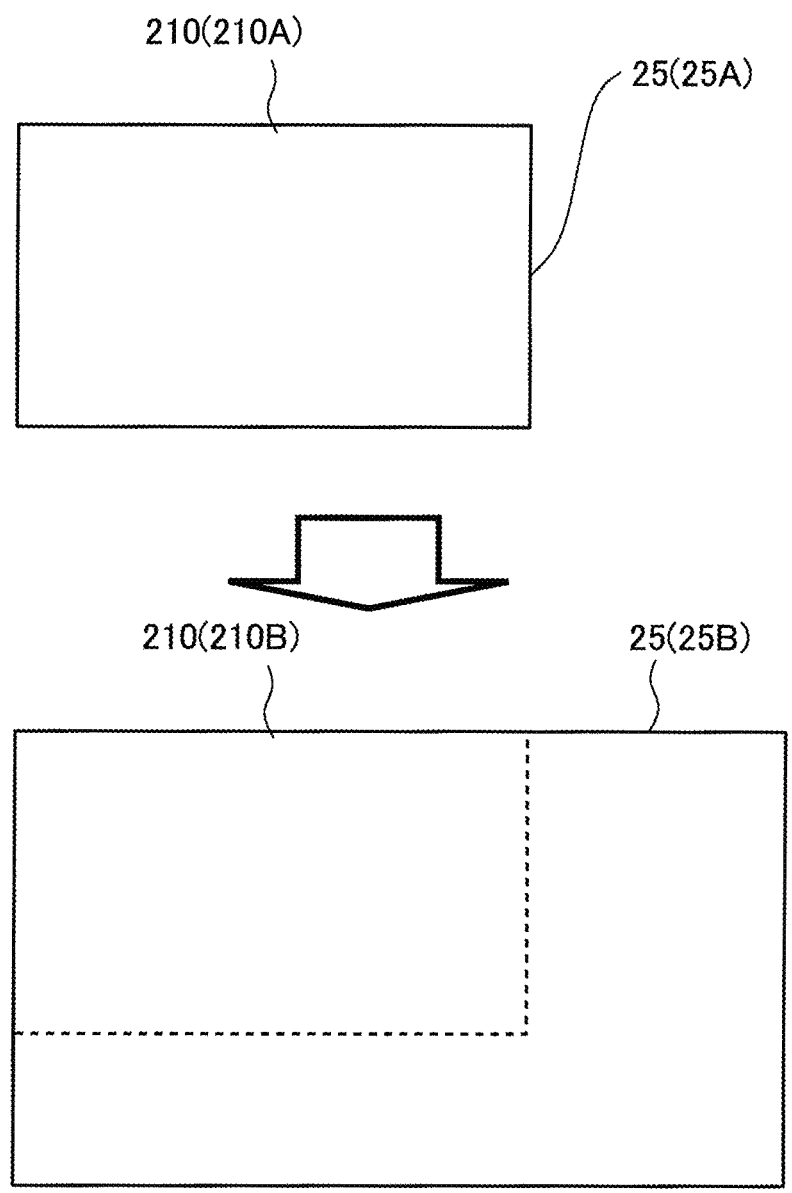
FIG. 6 is a conceptual diagram showing an exemplary automatic enlargement process.

FIG. 6 is a conceptual diagram showing an example of such an automatic enlargement process as described above. An upper stage of FIG. 6 shows an operation screen 210 of original size (an operation screen 210 displayed on the touch panel 25A). A lower stage of FIG. 6 shows the operation screen 210 after being enlarged (the operation screen 210 displayed on the touch panel 25B). FIG. 7 is a view showing the same process as shown in FIG. 6. In FIG. 6, the operation screen 210 is shown abstractly (only an outer frame of the operation screen 210 is shown), and in FIG. 7, the operation screen 210 of FIG. 5 is drawn in detail.

Figure 7:
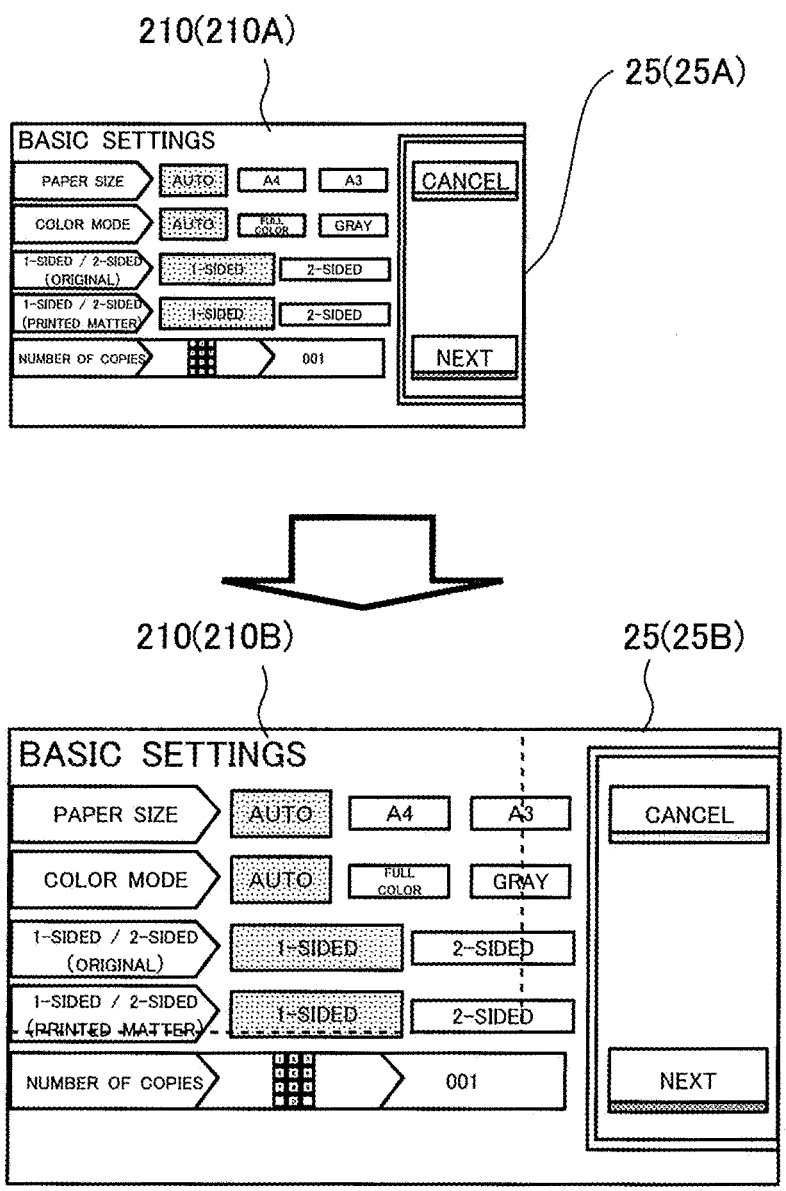
FIG. 7 is a view showing the same process as shown in FIG. 6 in detail.

The operation screen 210 (210A) shown on the upper side of FIGS. 6 and 7 is a screen having the same size as the pixel number size (e.g., 640×400 pixels) of the touch panel 25A of the old-type MFP. In other words, the display target content regarding the operation screen 210 (210A) has the same size as the pixel number size of the touch panel 25A of the old-type MFP.

On the other hand, on the lower side of FIGS. 6 and 7, shown is the operation screen 210 (210B) after being subjected to the automatic enlargement process. In this case, the pixel number size of the touch panel 25B of the new-type MFP 10 is 1.5 times (960×600 pixels) the pixel number size of the touch panel 25A of the old-type MFP.

The MFP 10 determines the enlargement ratio used in the automatic enlargement process in the following manners. First, the MFP 10 calculates a ratio R1 (=X2/X1) (herein, 1.5 times) of a horizontal pixel number size X2 (herein, 960 pixels) of the touch panel 25B to a horizontal pixel number size X1 (herein, 640 pixels) of the display target content. Further, the MFP 10 calculates a ratio R2 (=Y2/Y1) (herein, 1.5 times) of a vertical pixel number size Y2 (herein, 600 pixels) of the touch panel 25B to a vertical pixel number size Y1 (herein, 400 pixels) of the display target content. Then, the MFP 10 determines a relatively smaller one of the value R1 and the value R2 described above, as the enlargement ratio to be used in the above-described automatic enlargement process. Further, since the value R1 and the value R2 are equal to each other herein, the enlargement ratio is the same value (1.5 times) even if any one of these values is adopted.

Then, the MFP 10 enlarges the display target content by the enlargement ratio (1.5 times) and displays the enlarged display target content (see the lower stage of FIG. 7).

As a result, the enlarged operation screen 210B is displayed as a screen having a pixel size which is 1.5 times that of the original operation screen 210A in each of the horizontal and vertical directions. The operation screen 210B has the same size (960×600 pixels) as the pixel number size of the touch panel 25B of the above MFP (new-type MFP) 10.

Since the original operation screen 210A for the old-type touch panel 25 is enlarged so as to use the entire screen of the (relatively upsized) touch panel 25B and displayed as the operation screen 210B as shown in FIG. 7 and the like, operation members, characters, and the like in the operation screen 210 are each enlarged and displayed. Therefore, it is possible to increase the operability of the operation screen 210.

On the other hand, FIG. 21 is a view showing an exemplary display in accordance with a comparative example (specifically, an exemplary display in a case where the above-described automatic enlargement process is not performed). On an upper side of FIG. 21, the original operation screen 210 (210A) is displayed on the touch panel 25A of the old-type MFP, and on a lower side of FIG. 21, the original operation screen 210 (210A) is displayed on the touch panel 25B of the new-type MFP 10 at the unchanged pixel size (640×400 pixels). In a case of performing such a display as shown in FIG. 21, a blank (hatched portion) occurs on the right side and the lower side of the operation screen 210A on the touch panel 25B. In other words, the relatively upsized touch panel 25B is not effectively used.

As can be seen from the comparison with FIG. 21, by performing the automatic enlargement process in the above-described preferred embodiment, it is possible to effectively use the touch panel 25B which is larger than the touch panel 25A, as shown in FIG. 7 and the like. Further, it is also possible to suppress occurrence of any blank and maintain a good appearance.

<Another Automatic Enlargement Process>

Further, herein, the situation where the value R1 and the value R2 are equal to each other is exemplarily shown. In other words, the case where the aspect ratio of the display target content (the aspect ratio of the touch panel 25A of the old-type MFP) and the aspect ratio of the touch panel 25B of the new-type MFP 10 are equal to each other is exemplarily shown. When these are different from each other, the enlargement ratio used in the automatic enlargement process is determined, for example, in the following manner.

Figure 8:
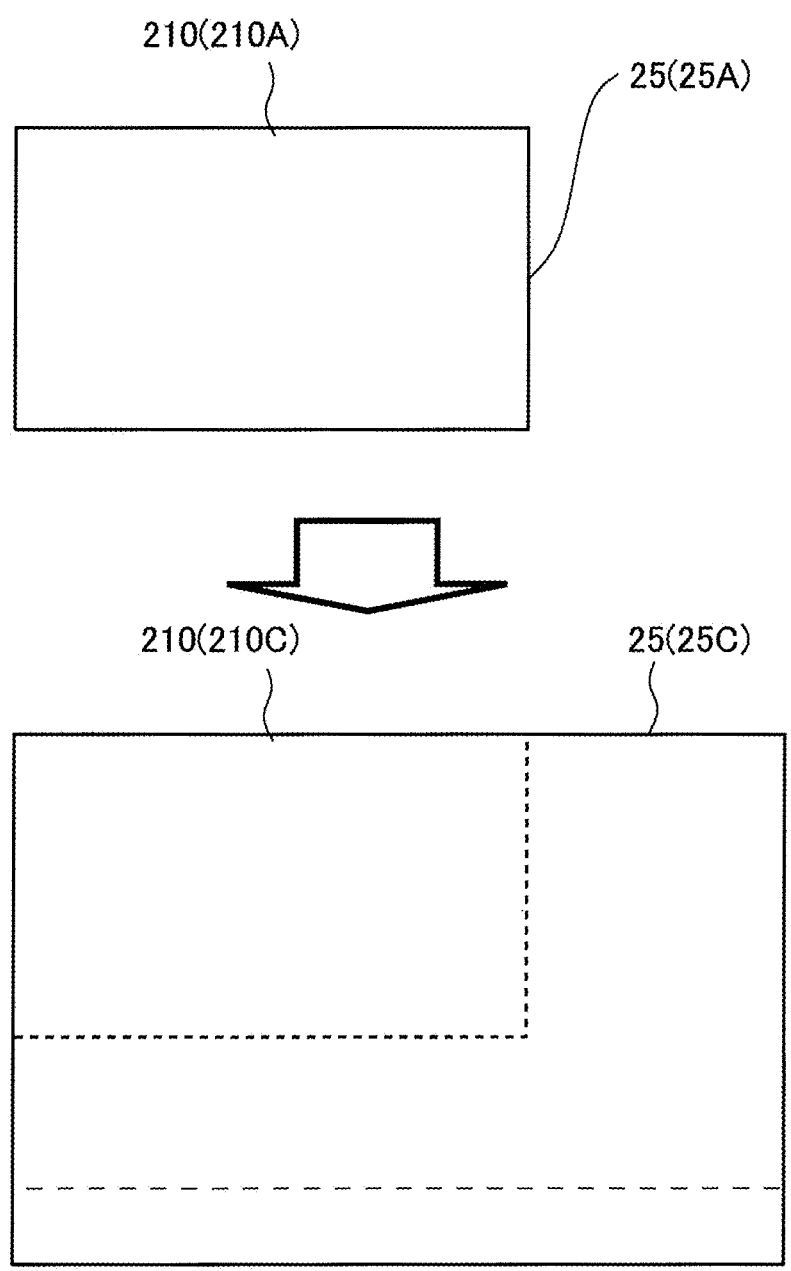
FIG. 8 is a conceptual diagram showing another exemplary automatic enlargement process.
Figure 9:
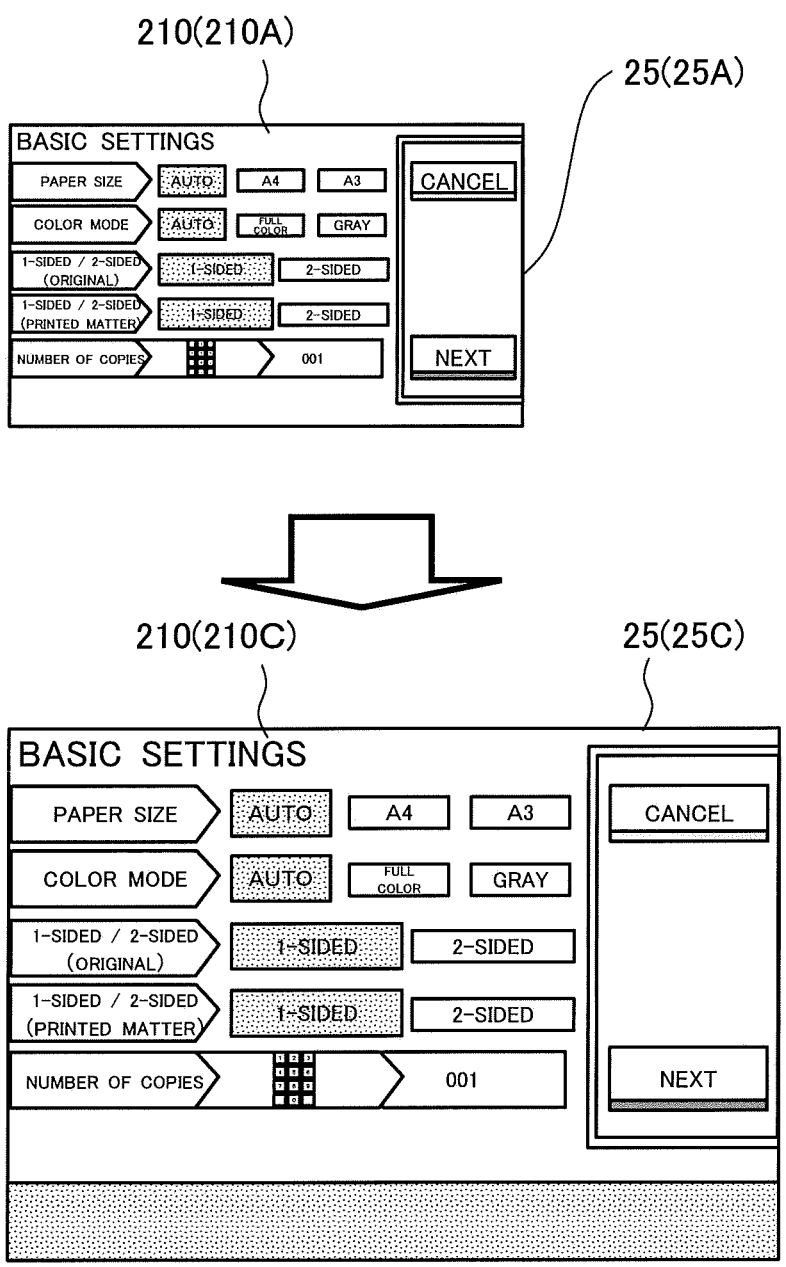
FIG. 9 is a view showing the same process as shown in FIG. 8 in detail.

FIGS. 8 and 9 show a situation where the value R2 is larger than the value R1. An upper stage of FIG. 8 shows the operation screen 210A (display target content) of original size, and a lower stage of FIG. 8 shows an operation screen 210C after being enlarged. FIG. 9 is a view showing the same process as shown in FIG. 8. In FIG. 8, the operation screen 210 is shown abstractly (only the outer frame of the operation screen 210 is shown), and in FIG. 9, the operation screen 210 of FIG. 5 is drawn in detail.

In FIGS. 8 and 9, in the horizontal direction, the pixel number size (960 pixels) of the touch panel 25C of the new-type MFP 10 is 1.5 times that of the touch panel 25A of the old-type MFP (in other words, the original pixel number size of the display target content). On the other hand, in the vertical direction, the pixel number size (700 pixels) of the touch panel 25C of the new-type MFP 10 is 1.75 times that of the touch panel 25A of the old-type MFP. In this situation, the value R1 is 1.5 and the value R2 is 1.75. Then, a relatively smaller one (herein, the value R1=1.5) of the value R1 and the value R2 is determined as the enlargement ratio to be used in the above-described automatic enlargement process, and the original display target content is automatically enlarged by the enlargement ratio and displayed (see the lower side of FIG. 9). It is thereby possible to enlarge the display target content so as to view the entire content.

Further, the determination of the enlargement ratio is not limited to this, but the relatively larger value R2 (=1.75) may be adopted as the enlargement ratio. In this case, however, since the right-side portion of the enlarged operation screen 210 extends off the touch panel 25C, such an adverse effect as to make the appearance worse, or the like, may be produced. For this reason, it is preferable, as described above, that the relatively smaller one of the value R1 and the value R2 should be determined as the enlargement ratio and the original display target content should be automatically enlarged by the enlargement ratio and displayed.

<Still Another Automatic Enlargement Process>

Figure 10:
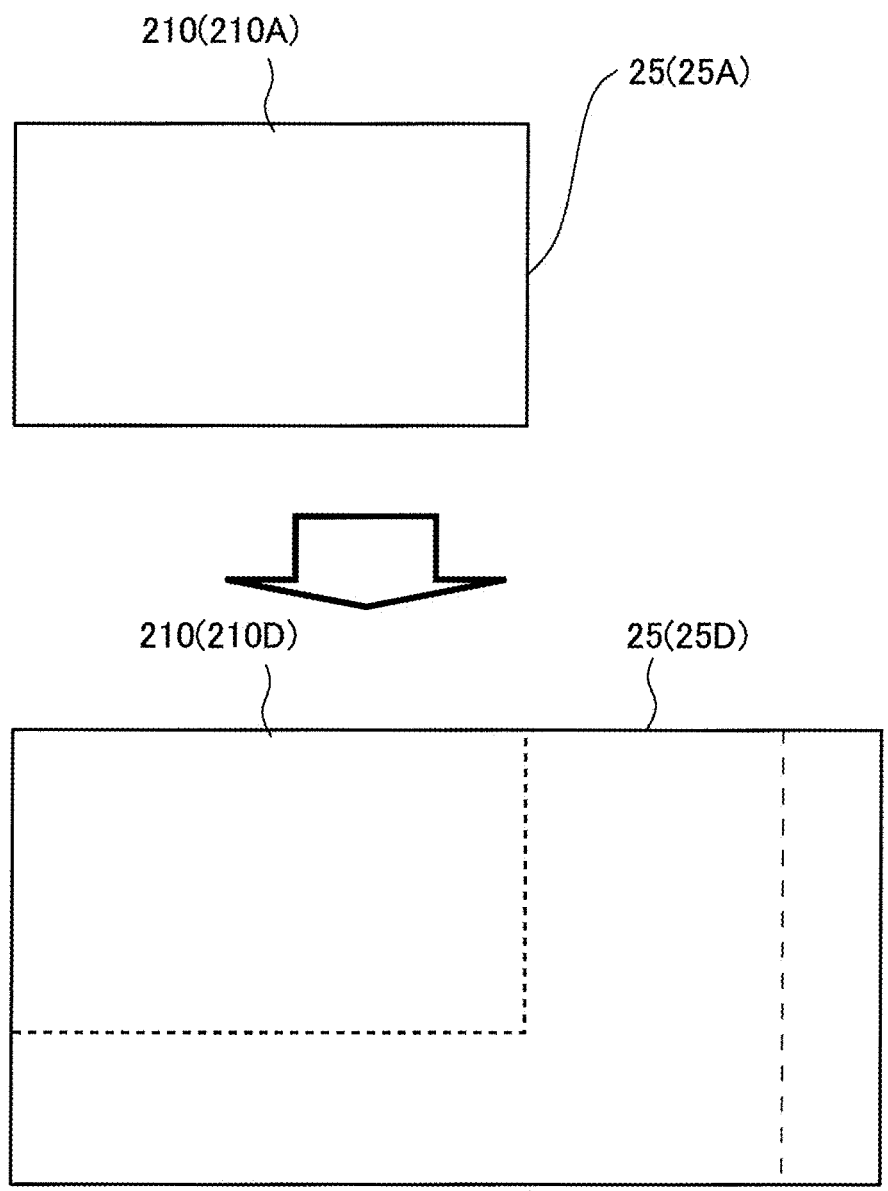
FIG. 10 is a conceptual diagram showing still another exemplary automatic enlargement process.
Figure 11:
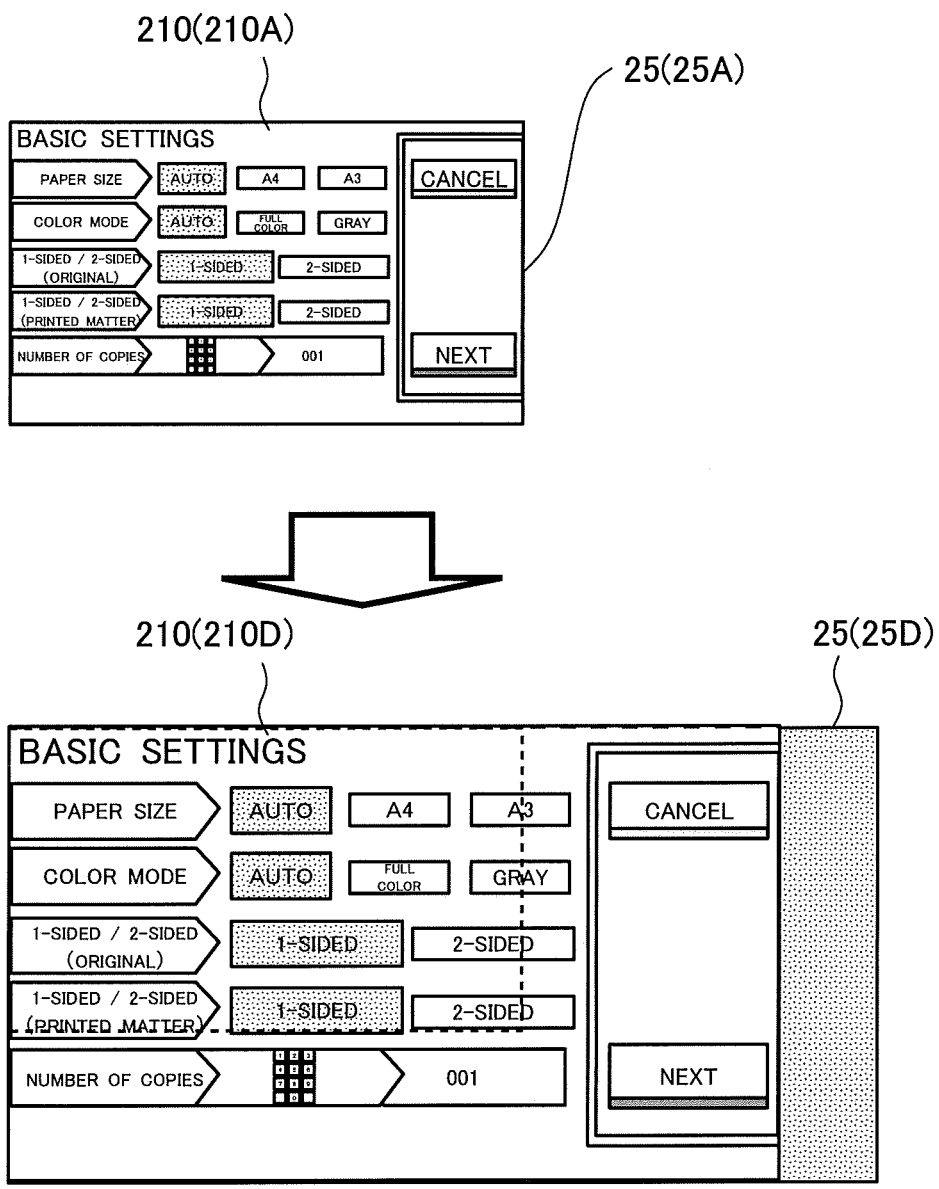
FIG. 11 is a view showing the same process as shown in FIG. 10 in detail.

Further, when the value R2 is smaller than the value R1 conversely, the following operation is performed. FIGS. 10 and 11 show a situation where the value R2 is smaller than the value R1. An upper stage of FIG. 10 shows the operation screen 210A (display target content) of original size, and a lower stage of FIG. 10 shows an operation screen 210D after being enlarged. FIG. 11 is a view showing the same process as shown in FIG. 10. In FIG. 10, the operation screen 210 is shown abstractly (only the outer frame of the operation screen 210 is shown), and in FIG. 11, the operation screen 210 of FIG. 5 is drawn in detail.

In FIGS. 10 and 11, in the horizontal direction, the pixel number size (1100 pixels) of the touch panel 25D of the new-type MFP 10 is about 1.7 times that of the touch panel 25A of the old-type MFP (in other words, the original pixel number size of the display target content). On the other hand, in the vertical direction, the pixel number size (600 pixels) of the touch panel 25D of the new-type MFP 10 is 1.5 times that of the touch panel 25A of the old-type MFP. In this situation, the value R1 is about 1.7 and the value R2 is 1.5. Then, a relatively smaller one (herein, the value R2=1.5) of the value R1 and the value R2 is determined as the enlargement ratio to be used in the above-described automatic enlargement process, and the original display target content is automatically enlarged by the enlargement ratio and displayed (see the lower side of FIG. 11). It is thereby possible to enlarge the display target content so as to view the entire content.

Further, the determination of the enlargement ratio is not limited to this, but the relatively larger value R1 (=1.7) may be adopted as the enlargement ratio. In this case, however, since the lower-side portion of the enlarged operation screen 210 extends off the touch panel 25D, such an adverse effect as to make the appearance worse, or the like, may be produced. For this reason, it is preferable, as described above, that the relatively smaller one of the value R1 and the value R2 should be determined as the enlargement ratio and the original display target content should be automatically enlarged by the enlargement ratio and displayed.

Furthermore, though the relatively smaller one of the value R1 and the value R2 is determined as the "enlargement ratio" to be used in the automatic enlargement process and the original display target content is automatically enlarged by the enlargement ratio and displayed herein, this is only one exemplary case. For example, the value R1 may be always determined as the enlargement ratio. Alternatively, the value R2 may be always determined as the enlargement ratio.

<Non-Automatic Enlargement (Other than Size-Fixed Content)>

Next, an operation in the case where the process goes from Step S15 to Step S19 in FIG. 4 will be described.

In this case, i.e., when it is determined that the display target content is not the specific type of content ("size-fixed content"), the display target content is displayed in accordance with the specification content included in the display target content.

FIG. 14 is a view showing an exemplary display screen 270 of the content which is determined not to be the specific type of content. FIG. 15 is a view showing a manner of displaying the display screen 270 of the display target content on each of the touch panels 25A and 25B.

In an upper stage of FIG. 15, a display screen 270A of the display target content is displayed with the original size on the touch panel 25A of the old-type MFP. Further, in a lower stage of FIG. 15, the display screen 270A of the display target content is displayed with unchanged size on the touch panel 25B of the new-type MFP 10. In other words, the display screen 270 (270A) of the display target content is displayed in accordance with the specification content included in the content.

As shown in the upper stage of FIG. 15, the display size (pixel number size) of the display target content is larger than the pixel number size of the touch panel 25A, and on the touch panel 25A, only part (only an area on the upper-left side) of the display target content is displayed. In order to display the right-side portion and the lower-side portion of the display target content, the scroll operation of the browser is required.

Further, as shown in the lower stage of FIG. 15, the display screen 270 (270A) of the display target content is displayed with unchanged size, without being enlarged, on the touch panel 25B which is larger than the touch panel 25A. As a result, information in a relatively wide range (herein, an entire range) of the entire range of the display screen 270 of the display target content is displayed on the touch panel 25B. In other words, a relatively large amount of information is displayed at a time, and the user can thereby acquire a relatively large amount of information without performing the scroll operation.

Furthermore, FIG. 23 is a view showing a technique (technique in accordance with the comparative example) for tentatively enlarging the display screen 270 of the display target content and displaying the screen. In this technique, as shown in a lower stage of FIG. 23, the display screen 270 of the display target content is enlarged by 1.5 times and displayed on the touch panel 25B. Though the size of the touch panel 25B is enlarged to 1.5 times that of the touch panel 25A, the display screen 270 of the display target content is also enlarged by the same magnification (1.5 times). For this reason, among the entire range of the display screen 270 of the display target content, the range displayed on the touch panel 25 (viewing range) is the same. In other words, though the characters are upsized by enlargedly displaying the content, the amount of information appearing in the display target area is not increased. In order to acquire the information written in a neighboring portion (right-side portion, lower-side portion, or the like) adjacent to the current display target portion, the scroll operation is still required. In other words, the benefit of the upsizing of the panel is not sufficiently enjoyed.

On the other hand, as shown in FIG. 15, in the preferred embodiment of the present invention, the display screen 270 (270A) of the display target content is displayed with unchanged size without being automatically enlarged (forcefully enlarged). It is thereby possible to display a relatively large amount of information at a time, and the user can acquire a relatively large amount of information without performing the scroll operation.

<Non-Automatic Enlargement (when C1 is Satisfied)>

Next, an operation in the case where the process goes from Step S13 to Step S19 in FIG. 4 will be described. In other words, the operation in the case where the condition C1 is satisfied will be described.

In this preferred embodiment, when the condition C1 (it is determined that the display target content includes a description (viewport attribute or the like) specifying in advance that the pixel number size of the display target content should be conformed to that of the display part) is satisfied, it is determined that the display target content is not the specific type of content.

When it is determined that the display target content includes a description (<meta name="viewport" content="width=device-width">) specifying that the lateral width of the content should be conformed to that of the panel, for example, it is determined that the display target content is the second type of content.

Then, the display target content is displayed in accordance with the specification content included in the display target content. In other words, the above-described automatic enlargement process (forceful enlargement process) is not performed.

Figure 12:
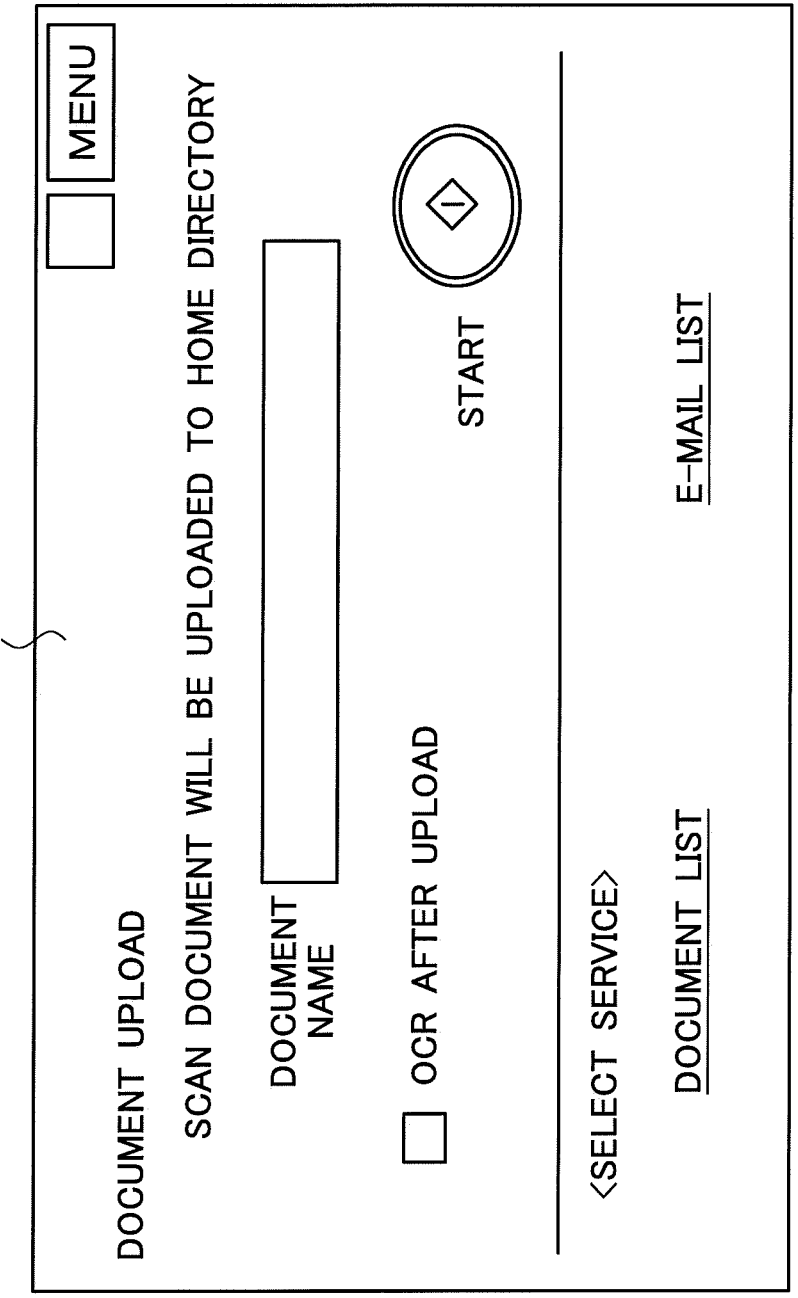
FIG. 12 is a view showing a content having a size specification by a viewport attribute.
Figure 13:
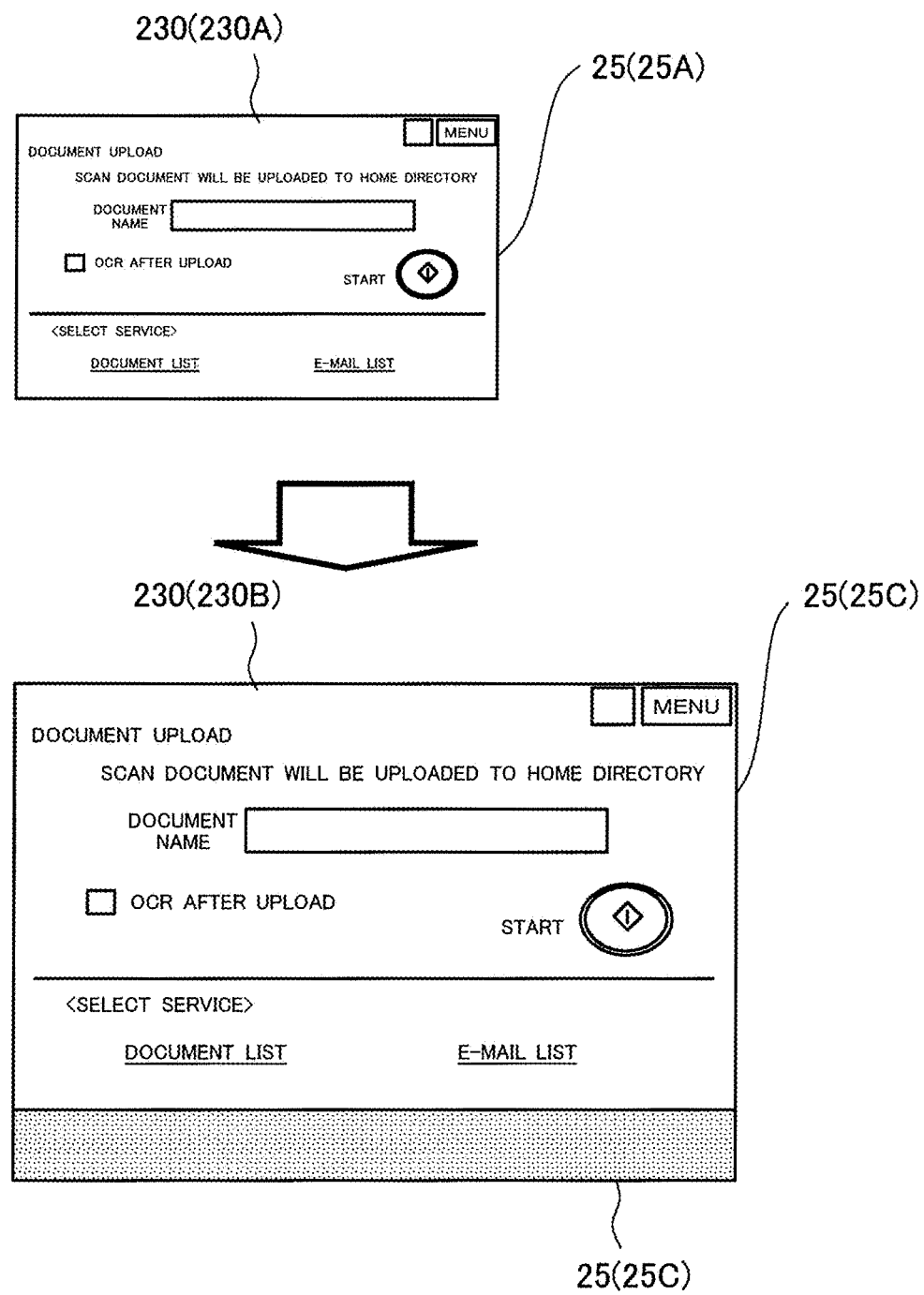
FIG. 13 is a view showing a manner of displaying the content of FIG. 12.

FIG. 13 is a conceptual diagram showing an example of such a display process as described above. An upper stage of FIG. 13 shows a display screen 230 (230A) of the display target content of original size (also see FIG. 12). Further, FIG. 12 is a view showing the display screen 230 of the display target content in detail. A lower stage of FIG. 13 shows a manner of displaying a display screen 230 (230B) of the display target content on the touch panel 25C in accordance with the specification content of the content.

Figure 22:
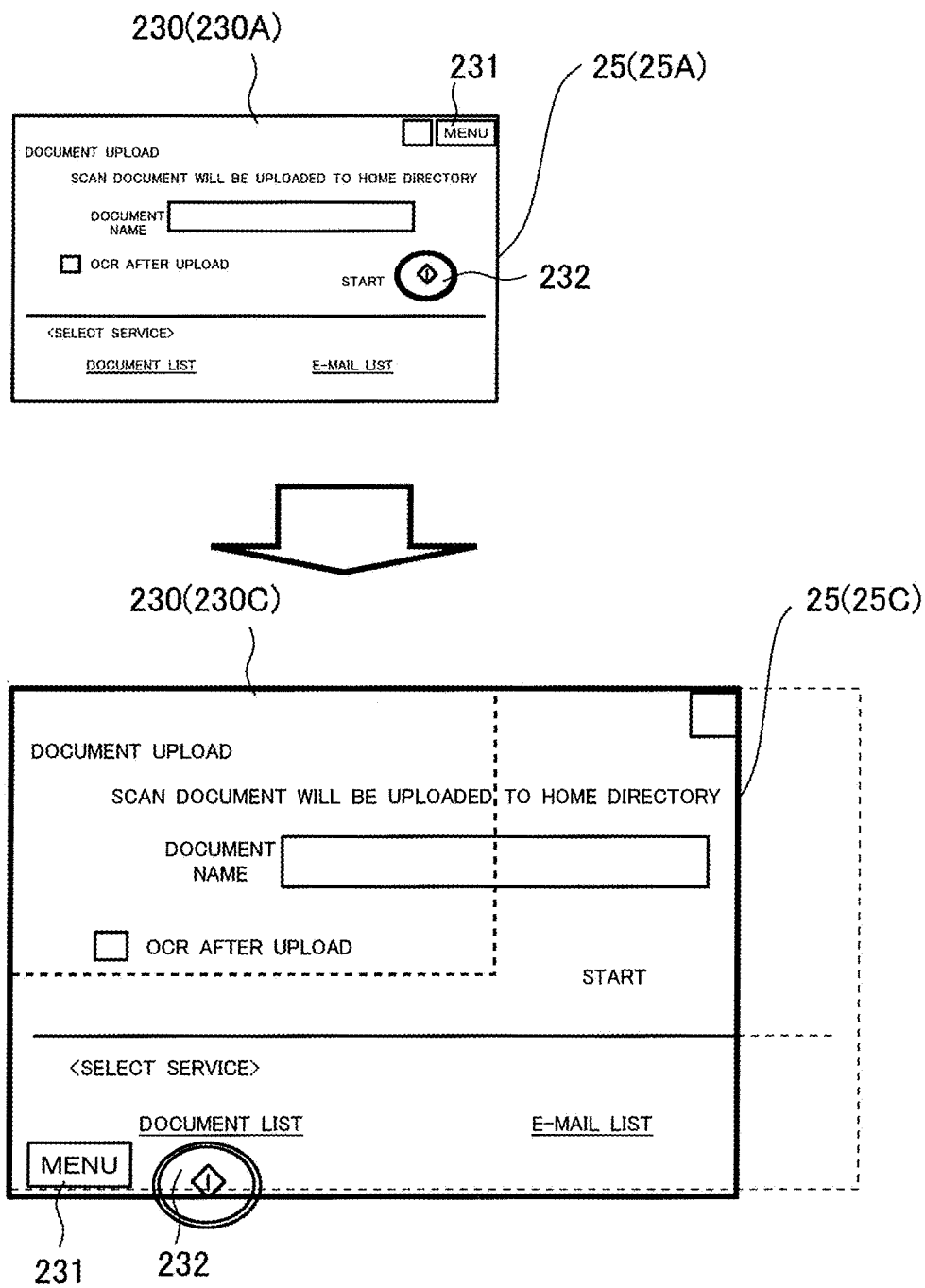

On the other hand, FIG. 22 is a view showing an exemplary display in accordance with a comparative example.

In an upper stage of FIG. 22, like in the upper stage of FIG. 13, shown is the display screen 230A of the display target content of original size (also see FIG. 12).

On the other hand, in a lower stage of FIG. 22, shown is a manner of displaying a display screen 230 (also referred to as 230C) of the display target content after being subjected to the "automatic enlargement process" (in other words, an enlargement process which is different from the specification content of the content). It is assumed herein, however, that the value R2 (the ratio between the new panel and the old panel in the vertical direction) is always adopted as the "enlargement ratio" to be used in the automatic enlargement process. Then, in the lower stage of FIG. 22, consequently, the relatively larger value (herein, the value R2=1.75) of the value R1 and the value R2 is determined as the "enlargement ratio", and the original display target content is automatically enlarged by the enlargement ratio and displayed (in the lower stage of FIG. 22).

Thus, as a result of such an automatic enlargement process (an enlargement process different from the specification content of the content), an abnormality occurs in a display content of the display screen 230 of the display target content. Specifically, component images 231 and 232 in the display screen 230 of the display target content are moved to positions (positions on relatively lower-left side in the screen) different from original positions (positions on relatively upper-right side in the screen). In short, a "wraparound" of the component images 231 and 232 occurs. Such a display is different from the intention of the author of the original display target content.

Such an unintended display is caused by the execution of the "automatic enlargement process (forceful enlargement process)", in other words, the execution of the enlargement process different from the specification content of the content.

In this preferred embodiment, as to the display screen 230 of the display target content including the description specifying that the lateral width of the content should be conformed to that of the panel, the display process in accordance with the specification content of the content is performed (see FIG. 13), and the "automatic enlargement process (forceful enlargement process)" is not performed. In other words, when the condition C1 (it is determined that the display target content includes a description (viewport attribute or the like) specifying in advance that the pixel number size of the display target content should be conformed to that of the display part) is satisfied, the display process in accordance with the specification content of the content is performed, and the "automatic enlargement process (forceful enlargement process)" is not performed. It is thereby possible to avoid occurrence of any abnormal display as shown in the lower stage of FIG. 22 and maintain a good appearance of the content, or the like.

<Non-Automatic Enlargement (when C2 is Satisfied)>

Next, an operation in the case where the process goes from Step S14 to Step S19 in FIG. 4 will be described. In other words, the operation in the case where the condition C2 is satisfied will be described.

In this preferred embodiment, when the condition C2 (it is determined that the display target content includes a description (media attribute or the like) defining a display style in accordance with a display target medium) is satisfied, it is determined that the display target content is not the specific type of content.

Then, when there is an explicit instruction (specification) on the display style in the display target content, like when the condition C1 is satisfied, it is preferential to comply the specification content in the display target content, instead of performing the automatic enlargement process. In other words, the intention of the author of the display target content is most esteemed. It is thereby possible to avoid occurrence of any unintended abnormal display and perform a display in accordance with the specification content of the display target content.

Further, when the display style is specified for each size of the display target medium, the optimum display style in accordance with the size of each display target medium is applied. When the size of the touch panel 25 (browser) is smaller than a predetermined degree, for example, a display style in which a relatively small amount of information in accordance with the relatively small size is displayed at a time can be adopted. Conversely, when the size of the touch panel 25 (browser) is larger than the predetermined degree, a display style in which a relatively large amount of information in accordance with the relatively large size is displayed at a time can be adopted.

Effects of Preferred Embodiment, Etc.

As shown in FIG. 7 and the like, since the operation screen 210 (size-fixed content) is so enlarged as to use the entire screen of the touch panel 25B and displayed through the above-described operation, each of the operation members, the characters, and the like in the operation screen 210 is enlargedly displayed. Therefore, it is possible to increase the operability of the operation screen 210.

On the other hand, as shown in FIG. 15, the display screen 270 of the non-size-fixed content is displayed with unchanged size without being automatically enlarged (forcefully enlarged). It is thereby possible to display a relatively large amount of information at a time, and the user can acquire a relatively large amount of information without performing the scroll operation.

Thus, it is possible to perform an appropriate display on the touch panel 25B (in detail, the browser thereof) in accordance with the type of content.

2. The Second Preferred Embodiment

The second preferred embodiment is a variation of the first preferred embodiment. Hereinafter, description will be made, centering on the difference between the first and second preferred embodiments.

Figure 16:
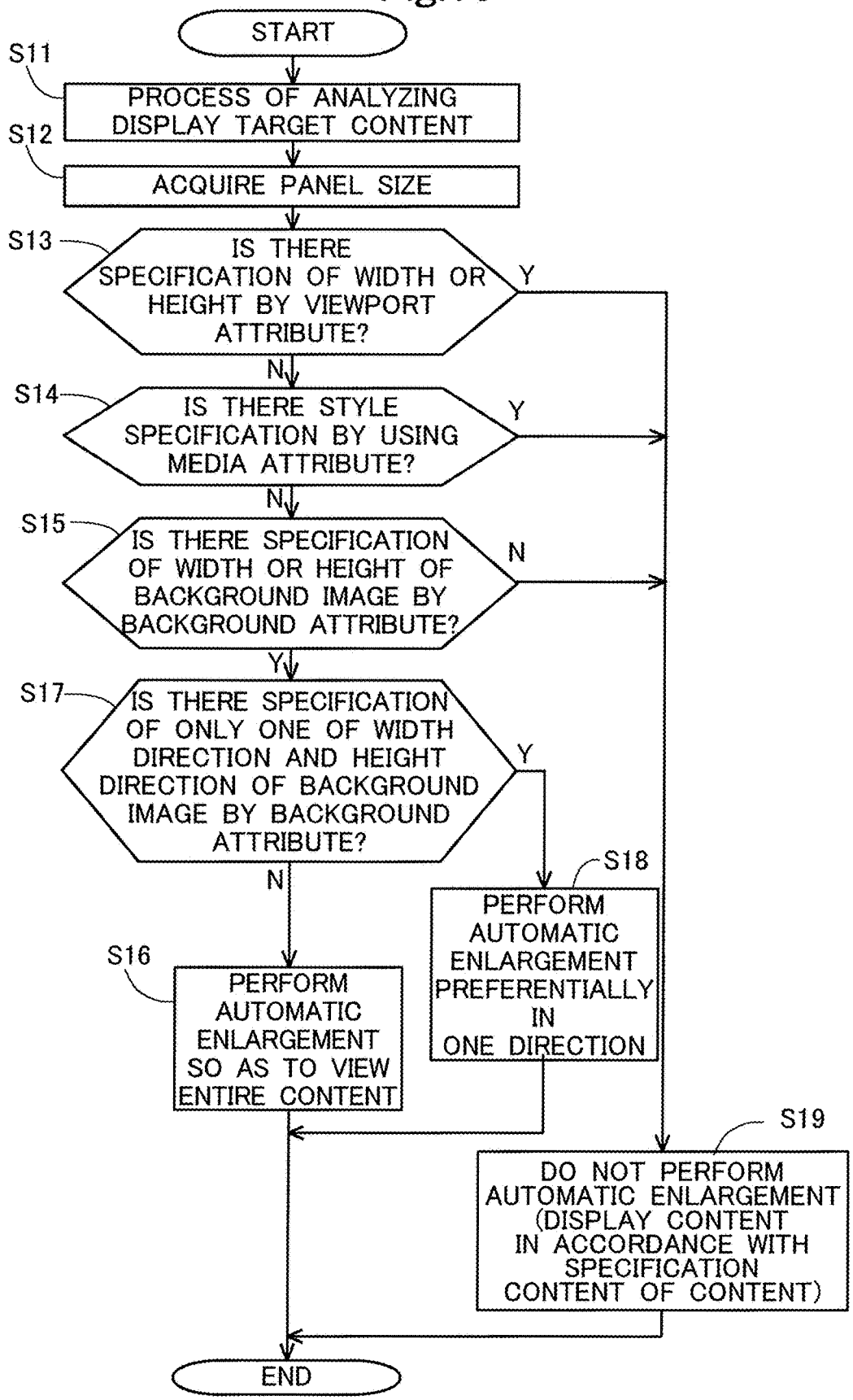
FIG. 16 is a flowchart showing an operation in accordance with a second preferred embodiment.

FIG. 16 is a flowchart showing an operation in accordance with the second preferred embodiment.

In the second preferred embodiment, the operation is different from that in the first preferred embodiment, in the processes of Steps S16, S17, and S18.

Specifically, after "YES" is determined in Step S15, the process goes to Step S17.

In Step S17, it is determined whether or not there is a specification (specification on the background image size) by the background attribute only in one of the horizontal direction and the vertical direction of the background image size. In other words, it is determined whether or not there is a specification only on one of the width and the height of the background image size by the background attribute. Then, when the determination result is "YES", the process goes to Step S18, and when the determination result is "NO", the process goes to Step S16.

In Step S16, performed is the same operation as that in the above-described first preferred embodiment.

On the other hand, in Step S18, one of the values R1 and R2, which is a value regarding the direction (specified direction) specified by the background attribute, is determined as the enlargement ratio, and the display target content is enlarged by the enlargement ratio and displayed. In other words, a ratio (V2/V1) of a pixel number size (V2) of the touch panel 25 (25B) in the specified direction to a pixel number size (V1) of the background image of the display target content in the specified direction is determined as the enlargement ratio.

Specifically, when the pixel number size of the background image is specified only in the horizontal direction, the value R1 indicating a ratio in the horizontal direction is used as the enlargement ratio. It is thereby possible to perform a display in consideration of the intention of the author of the display target content, who specifies the size in the horizontal direction.

Conversely, when the pixel number size of the background image is specified only in the vertical direction, the value R2 indicating a ratio in the vertical direction is used as the enlargement ratio. It is thereby possible to perform a display in consideration of the intention of the author of the display target content, who specifies the size in the vertical direction.

In such a case, when the automatic enlargement process is performed, it is possible to perform a display in further consideration of the intention of the author of the display target content.

3. Variations, Etc.

Though the preferred embodiments of the present invention have been described above, the present invention is not limited to the above-described exemplary cases.

<Customization Attribute>

For example, though it is determined, on the basis of the "background" attribute which is a general description on the attribute information of the background image, that the display target content is the specific type of content in the above-described preferred embodiments, this is only one exemplary case.

Specifically, it may be determined that the display target content is the specific type of content, on the basis of whether or not there is an original description (for example, "km_size" attribute (see FIG. 17)) which is customized to each development user (vendor), or the like.

In more detail, it may be determined that the display target content is the specific type of content when the display target content includes a specific customization attribute (in detail, a customization attribute on the display size) (see FIG. 17).

FIG. 17 is a view showing an example of such a description as described above. The description on the "km_size" attribute is defined, as a description defining the size of the content, by the development user. In FIG. 17, by using the "km_size" attribute, it is defined that the width of the content is 800 pixels and the height of the content is 600 pixels, and the like. It may be determined that the display target content is the "size-fixed content" when the display target content has such a description.

Alternatively, it may be determined that the display target content is the specific type of content, on the basis of that the display target content includes a specific customization attribute (in detail, a customization attribute on a content type). FIG. 18 is a view showing an example of such a description as described above. In FIG. 18, a description (tag) including <html km_type="panel"> is written. The description is defined, as a description defining that the content type is made for the "panel" (of the MFP 10), by the development user. The MFP 10 may determine that the display target content is the "size-fixed content" when the display target content has such a description.

<File Name>

Further, it may be determined that the display target content is the specific type of content, on the basis of that a file name of the display target content includes a specific reserved word (see FIG. 19).

FIG. 19 is a view showing a file name "abcresize.html" of the display target content. This file name includes a specific reserved word "resize". This reserved word "resize" is a word indicating that the above-described automatic enlargement process should be performed (the size should be changed). The MFP 10 may determine that the display target content is the "size-fixed content" when the file name of the display target content includes such a specific reserved word. Further, it may be determined that the display target content is not the specific type of content, on the basis of that a file name of the display target content does not include such a specific reserved word.

<Display on External Terminal>

Further, though the display operation in the browser display screen of the operation panel part 6c (touch panel 25) of the MFP 10 has been described in the above-described preferred embodiments, this is only one exemplary case. For example, the present invention may be applied to a display operation in a browser display screen of an external terminal (a portable terminal such as a tablet terminal or the like) which cooperates with the MFP 10.

Figure 20:
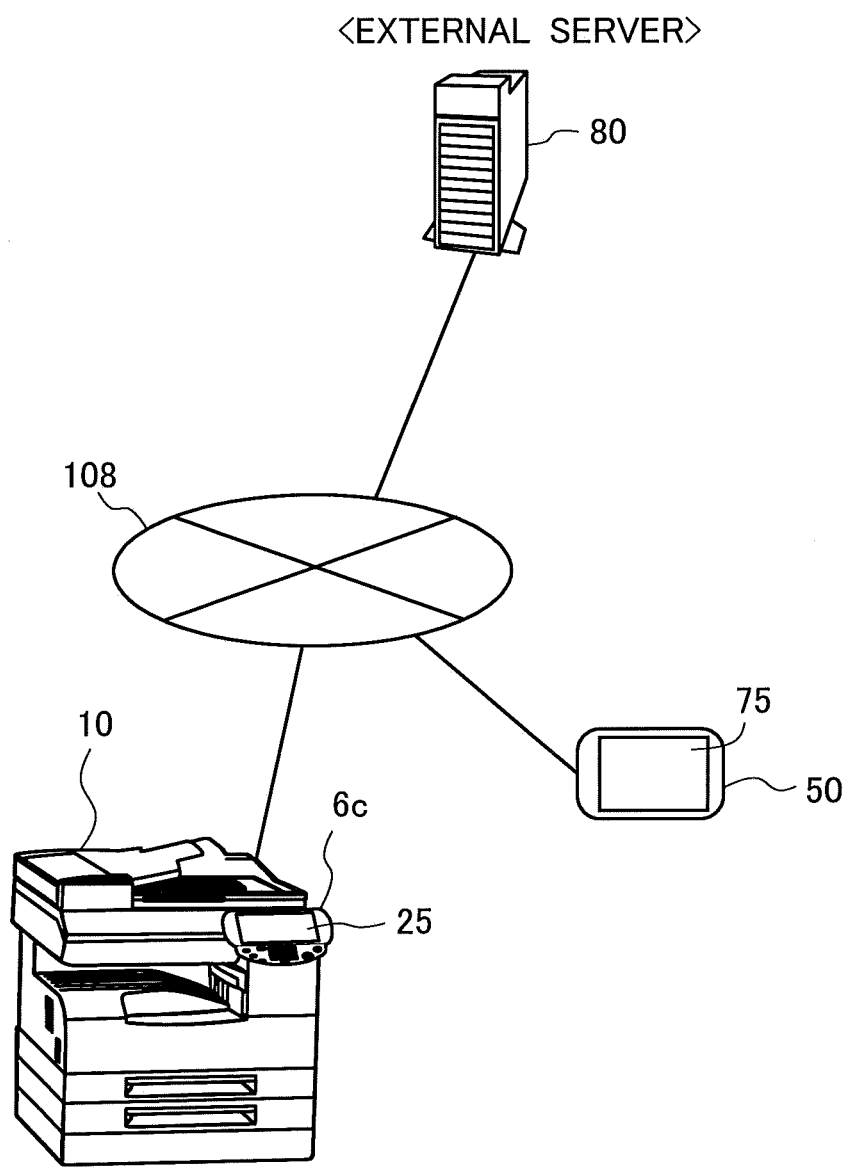
FIG. 20 is a view showing a system in accordance with a variation.

FIG. 20 is a view showing a system 1B in accordance with such a variation. The system 1B includes an external terminal 50 as well as the MFP 10 and the server 80. The external terminal 50 is constructed as a portable terminal such as a tablet terminal or the like. In the external terminal 50, stored are the above-described program P1 and the like. Further, the program P1 may be recorded in one of various portable recording media (in other words, various non-transitory computer-readable recording media), such as a CD-ROM or the like, and read out from the recording medium to be installed in the external terminal 50. Alternatively, the program may be downloaded via the network 108 or the like to be installed in the external terminal 50.

In the external terminal 50 of FIG. 20 (in detail, in a computer embedded in the external terminal 50), by executing the above-described program P1 (application having the browser function) stored in the external terminal 50, the same operation as the display operation in the MFP 10 in the above-described preferred embodiments is performed. Further, the internal server 30 in the MFP 10 functions like an external server for the external terminal 50. In other words, in response to a web request (HTTP request or the like) from the external terminal 50, the internal server 30 in the MFP 10 can send back the data of the display target content, to thereby cause the external terminal 50 to display thereon a web page regarding the display target content. Further, the external terminal 50 can also display thereon a web page from the external server 80. Then, like in the above-described preferred embodiments, various contents may be displayed in accordance with the specification content thereof, or may be displayed, being subjected to the automatic enlargement process. In this case, instead of the pixel number size of the touch panel 25B, a pixel number size of a touch panel 75 of the external terminal 50 (a pixel number size of a display screen of a browser in the external terminal 50) may be considered.

While the invention has been shown and described in detail, the foregoing description is in all aspects illustrative and not restrictive. It is therefore understood that numerous modifications and variations can be devised without departing from the scope of the invention.

What is claimed is:

1. An image processing apparatus comprising:
    an acquisition part for acquiring information on a pixel size of a display screen of said image processing apparatus;
    a receiving part for receiving a display content of a web page that is to be displayed on the display screen of said image processing apparatus, the display content being all the content to be displayed on the display screen at one time;
    a determination part for determining whether the display content is a size-fixed content that includes an attribute that fixes a display size of the display content to a specified fixed number of pixels; and
    a display control part for displaying said display content on said display screen, on the basis of a determination result on the type of said display content,
    wherein said display control part automatically overrides the display content attribute and enlarges said display content in conformity with the pixel size of said display screen to use the entire size of said display screen and displays said enlarged display content, when said display target content is determined to have a size-fixed content, and
    said display control part displays said display content in accordance with a size specification included in said display content when said display target content is determined not to include an attribute that fixes a display size of the display content to a specified fixed number of pixels.

2. The image processing apparatus according to claim 1, wherein
    said display control part determines a relatively smaller one of a first value indicating a ratio of a horizontal pixel number size of said display part to that of said display content and a second value indicating a ratio of a vertical pixel number size of said display part to that of said display content, as an enlargement ratio, and enlarges said display content by said enlargement ratio and displays said display content.

3. The image processing apparatus according to claim 1, wherein
said determination part determines said display content to have a size-fixed content when said determination part determines that a pixel number size of a background image in said display target content is specified with a fixed value, on the basis of attribute information of said background image.

4. The image processing apparatus according to claim 3, wherein
said display control part determines a relatively smaller one of a first value indicating a ratio of a horizontal pixel number size of said display part to that of said background image and a second value indicating a ratio of a vertical pixel number size of said display part to that of said background image, as an enlargement ratio, and enlarges said display content by said enlargement ratio and displays said display content.

5. The image processing apparatus according to claim 3, wherein
when there is a specification on a size of said background image only in one of a vertical direction and a horizontal direction, said display control part determines a ratio of a pixel number size of said display part in said one direction to that of said background image in said one direction, as an enlargement ratio, and enlarges said display content by said enlargement ratio and displays said display content.

6. The image processing apparatus according to claim 1, wherein
said determination part determines said display content to have a size-fixed content when said determination part determines that a file name of said display content includes a specific reserved word.

7. The image processing apparatus according to claim 1, wherein
said determination part determines said display content to have a size-fixed content when said determination part determines that said display content includes a specific customization attribute on a display size.

8. The image processing apparatus according to claim 1, wherein
said determination part determines said display content to have a size-fixed content when said determination part determines that said display content includes a specific customization attribute on a content type.

9. The image processing apparatus according to claim 1, wherein
said determination part determines said display content not to have a size-fixed content when said determination part determines that said display content includes a description specifying in advance that a pixel number size of said display content should be conformed to that of said display part.

10. The image processing apparatus according to claim 1, wherein
said determination part determines said display content not to have a size-fixed content when said determination part determines that said display content includes a description defining a display style for each display medium.

11. The image processing apparatus according to claim 1, wherein
said size-fixed content is a content of type whose display size is specified with a fixed value.

12. A non-transitory computer-readable recording medium for recording therein a computer program to be executed by a computer, to cause said computer to perform the steps of:
receiving a display content of a web page that is to be displayed on the display screen of said image processing apparatus, the display content being all the content to be displayed on the display screen at one time;
acquiring information on a size of a display screen of said image processing apparatus;
determining whether the display content is a size-fixed content that includes an attribute that fixes a display size of the display content to a specified fixed number of pixels; and
displaying said display content on said display screen, on the basis of a determination result on the type of said display content,
wherein said displaying step includes:
automatically overriding the display content attribute and enlarging said display content in conformity with the pixel size of said display screen to use the entire size of said display screen and displaying said display content; and
displaying said display content in accordance with a size specification included in said display content when said display content is determined not to include an attribute that fixes a display size of the display content to a specified fixed number of pixels.

13. The non-transitory computer-readable recording medium according to claim 12, wherein
a relatively smaller one of a first value indicating a ratio of a horizontal pixel number size of said display part to that of said display content and a second value indicating a ratio of a vertical pixel number size of said display part to that of said display content is determined as an enlargement ratio, and said display content is enlarged by said enlargement ratio and displayed in said displaying step.

14. The non-transitory computer-readable recording medium according to claim 12, wherein
said display content is determined to have a size-fixed content when it is determined that a pixel number size of a background image in said display content is specified with a fixed value, on the basis of attribute information of said background image in said acquiring step.

15. The non-transitory computer-readable recording medium according to claim 14, wherein
a relatively smaller one of a first value indicating a ratio of a horizontal pixel number size of said display part to that of said background image and a second value indicating a ratio of a vertical pixel number size of said display part to that of said background image is determined as an enlargement ratio, and said display content is enlarged by said enlargement ratio and displayed in said displaying step.

16. The non-transitory computer-readable recording medium according to claim 14, wherein
when there is a specification on a size of said background image only in one of a vertical direction and a horizontal direction, a ratio of a pixel number size of said display part in said one direction to that of said background image in said one direction is determined as an enlargement ratio, and said display content is enlarged by said enlargement ratio and displayed in said displaying step.

17. The non-transitory computer-readable recording medium according to claim 14, wherein
said display content is determined to have a size-fixed content when it is determined that a file name of said display content includes a specific reserved word in said acquiring step.

18. The non-transitory computer-readable recording medium according to claim 14, wherein
said display target content is determined to have a size-fixed content when it is determined that said display content includes a specific customization attribute on a display size in said acquiring step.

19. The non-transitory computer-readable recording medium according to claim 14, wherein
said display target content is determined to have a size-fixed content when it is determined that said display content includes a specific customization attribute on a content type in said acquiring step.

20. The non-transitory computer-readable recording medium according to claim 14, wherein
said display target content is determined not to have a size-fixed content when it is determined that said display content includes a description specifying in advance that a pixel number size of said display content should be conformed to that of said display part in said acquiring step.

21. The non-transitory computer-readable recording medium according to claim 14, wherein
said display content is determined not to have a size-fixed content when it is determined that said display content includes a description defining a display style for each display target medium in said acquiring step.

22. The non-transitory computer-readable recording medium according to claim 14, wherein
said size-fixed content is a content of type whose display size is specified with a fixed value.

23. An image processing apparatus comprising:
an acquisition part for acquiring information on a pixel size of a display screen of said image processing apparatus;
a receiving part for receiving a display content of a web page that is to be displayed on the display screen of said image processing apparatus, the display content being all the content to be displayed on the display screen at one time;
a determination part for determining whether the display content is a size-fixed content that includes an attribute that fixes a display size of the display content to a specified fixed number of pixels based on attribute information included with the display content, regardless of a size of the display screen; and
a display control part for displaying said display content on said display screen, on the basis of a determination result on the type of said display content,
wherein:
when said display content is determined to have a size-fixed content, said display control part automatically overrides the display content attribute and enlarges said display content in conformity with a pixel size of said display screen to use the entire size of said display screen and displays said display content, and
when said display content is determined not to have a size-fixed content, said display control part displays said display content in accordance with specification content included in said display content.

\* \* \* \* \*